(12) United States Patent
Kim

(10) Patent No.: US 8,344,306 B2
(45) Date of Patent: Jan. 1, 2013

(54) IMAGING METHOD AND APPARATUS

(75) Inventor: Seong Jin Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 700 days.

(21) Appl. No.: 12/458,788

(22) Filed: Jul. 22, 2009

(65) Prior Publication Data

US 2010/0020209 A1  Jan. 28, 2010

(30) Foreign Application Priority Data

Jul. 25, 2008 (KR) .................. 10-2008-0072992

(51) Int. Cl.
*H04N 13/02* (2006.01)
(52) U.S. Cl. ................ 250/208.1; 348/46
(58) Field of Classification Search ........... 250/208.1, 250/214.1, 214 R, 339.02, 339.05; 257/432, 257/440; 438/69; 348/46
See application file for complete search history.

(56) References Cited

U.S. PATENT DOCUMENTS

| 7,224,384 | B1 | 5/2007 | Iddan et al. | |
|---|---|---|---|---|
| 7,262,402 | B2 | 8/2007 | Niclass et al. | |
| 2003/0052252 | A1 | 3/2003 | Sugiyama et al. | |
| 2004/0196398 | A1 | 10/2004 | Doering et al. | |
| 2005/0231618 | A1 | 10/2005 | Sugiyama | |
| 2006/0065811 | A1 | 3/2006 | Yoon et al. | |
| 2009/0189056 | A1* | 7/2009 | Audet | 250/208.1 |
| 2009/0294886 | A1* | 12/2009 | Hsu et al. | 257/432 |
| 2009/0298220 | A1* | 12/2009 | Anderson et al. | 438/70 |
| 2010/0007717 | A1* | 1/2010 | Spektor et al. | 348/43 |
| 2010/0079581 | A1* | 4/2010 | Russell et al. | 348/46 |

FOREIGN PATENT DOCUMENTS

| JP | 06-204445 | 7/1994 |
|---|---|---|
| JP | 2002-142228 | 5/2002 |
| JP | 2005-175391 | 6/2005 |
| JP | 2005-175392 | 6/2005 |
| JP | 2005-309072 | 11/2005 |
| JP | 2006-067194 | 3/2006 |
| JP | 2006-190958 | 7/2006 |
| JP | 2007-242878 | 9/2007 |
| JP | 2007-311447 | 11/2007 |
| KR | 10-2003-0067116 | 8/2003 |
| KR | 10-2008-0029051 | 4/2008 |
| WO | WO 02/49367 | 6/2002 |

OTHER PUBLICATIONS

Young Chan Kim et al., "½-inch 7.2 MPixel CMOS Image Sensor with 2.25/spl mu/m Pixels Using 4-Shared Pixel Structure for Pixel-Level Summation" Solid-State Circuits, 2006 IEEE International Conference digest of Technical Papers Feb. 6-9, 2006, Piscataway, NJ, USA IEEE, Feb. 6, 2006 pp. 1994-2003.
Takahashi, Hidekazu et al., "A 3.9μm Pixel Pitch VGA Format 10b Digital Image Sensor with 1.5-Transistor/Pixel," ISSCC 2004, pp. 108-109.
Mitsuyoshi, Mori et al., "A ¼in 2M Pixel CMOS Image Sensor with 1.75 Transistor/Pixel," ISSCC 2004, pp. 110-111.
Kasano, Masahiro et al., "A 2.0μm Pixel Pitch MOS Image Sensor With 1.5 Transistor/Pixel and an Amorphous Si Color Filter", ISSCC 2005, pp. 348-349.

* cited by examiner

*Primary Examiner* — Seung C Sohn
(74) *Attorney, Agent, or Firm* — Staas & Halsey LLP

(57) ABSTRACT

Disclosed are an imaging method and apparatus. The apparatus may include an image sensor that may include a plurality of pixels, wherein at least one pixel of the plurality of pixels includes a light-detector element and a filter that band-passes a select visible light component to the light-detector element and band-passes a select non-visible light component to the light-detector element. A color value and depth value may be obtained using the same pixel through the image sensor.

79 Claims, 19 Drawing Sheets

IMAGING METHOD AND APPARATUS

CROSS-REFERENCE TO RELATED APPLICATIONS

This application claims the priority benefit of Korean Patent Application No. 10-2008-0072992, filed on Jul. 25, 2008 in the Korean Intellectual Property Office, the disclosure of which is incorporated herein by reference.

BACKGROUND

1. Field

One or more embodiments relating to an imaging method and apparatus.

2. Description of the Related Art

Currently, portable devices having image sensors, such as digital cameras, mobile communication terminals, and the like, are being developed and marketed. These image sensors are made up by an array of small photodiodes referred to as pixels or photosites. In general, a pixel does not directly extract a particular color from received light, but converts a photon of a wide spectrum band into an electron or charge. Accordingly, the pixel of the image sensor may only need to receive light within a band necessary for obtaining or identifying a color from the light of the wide spectrum band. Each pixel of the image sensor can convert only a photon corresponding to a specific color into an electron or charge by first filtering incident light through a color filter and the like.

To obtain a three-dimensional (3D) image using such an image sensor, color and also information about the distance between a corresponding object and the image sensor need to be obtained. In general, a reconstituted image with respect to the distance between the object and an image sensor is expressed as a depth image in the related field. As an example, the depth image may be obtained using infrared light outside a region of visible light.

In this regard, generally, there are two methods for acquiring a color image and a depth (or distance) image of an object. The first method uses a beam splitter to reflect or redirect light in a specific wavelength-band and refract the remainder of the light, e.g., to refract light of a plurality of wavelength-bands into split/separate light rays representing different wavelength-bands. As illustrated in FIG. 16, the beam splitter separates incident visible light required for a color image and incident infrared light required for the depth image. Here, this beam splitter approach requires more than two sensors to detect the separated light, thereby acquiring the distinctly different color and depth information. U.S. Pat. No. 7,224,384 illustrates an example of such a 3D sensing system. Such a beam-splitting approach requires the use of a beam splitter and typically more than two sensors, which generates size and cost problems. Here, the size and cost of such a system for acquiring an image may be too large or high for a conventional camera application. In addition, with such an arrangement, since the characteristics and required positioning of the sensors are all different, image matching of a color image and a depth image may not be easy.

The second method for acquiring the color image and the depth image includes using only a single sensor. FIG. 17(a) is a conceptual diagram illustrating a color sensor in which pixels sensing infrared light are arranged in a dispersed manner over a conventional color sensor. In this example, a pixel sensing infrared light can be equally arranged along side of the pixels sensing visible light for R, G, and B wavelengths. FIG. 17(b) is a diagram set forth in U.S. Pat. No. 7,262,402, and illustrates an n×m sensor array with small-sized pixels 101 measuring the strength of the visible light, e.g., for visible light for R, G, and B wavelengths, and large-sized pixels 100 measuring the return time of a radiated infrared light reflecting from an object to estimate the depth of the object. This technique for measuring the depth based on reflected light is referred to as time-of-flight (TOF).

FIG. 17(c) is a diagram set forth in International WIPO patent application PCT/IL01/01159, and illustrates the use of a large-size pixel 21 sensing infrared light and the other pixels 22, 23, and 24 respectively sensing Red, Green, and Blue. Here, since the sensor for infrared light is located between pixels for visible light, the spatial resolution of the color image and the spatial resolution of the depth image decrease. Still further, with such an arrangement, there may be problems that a specific circuit is needed to estimate the TOF of the infrared light and the sensor should be larger than a color pixel to compensate for the lower sensitivity regarding infrared light. In the example sensor of FIG. 17(b), the specific detector in the corresponding pixel is further limited to be a single photon avalanche diode (SPAD).

According, there is a need to overcome these conventional drawbacks.

SUMMARY

An aspect of one or more embodiments provides a method and apparatus for obtaining a color image expressed by a color and a depth image expressed by a distance, using a single pixel.

In an aspect of one or more embodiments, the color image and depth image are obtained by the single pixel without reducing resolution compared to conventional image detection with depth image detection.

In an aspect of one or more embodiments, a size of the image sensor may be decreased using a pixel structure that a plurality of pixels share in a detecting circuit compared to a image sensor having separate pixels for depth image detection.

In an aspect of one or more embodiments, a Signal to Noise Ratio (SNR) of the depth image may increase without requiring large sized pixels for depth image detection.

According to an aspect of one or more embodiments, there is provided an image sensor including a plurality of pixels, wherein a color value and depth value are obtained from at least one same pixel of the plurality of pixels.

To achieve the above and/or other aspects, one or more embodiments include an image sensor, including a plurality of pixels, with at least one of the plurality of pixels being configured to separately output an indication of a color value and an indication of a depth value.

To achieve the above and/or other aspects, one or more embodiments include an imaging device, including a light source, and an image sensor including a plurality of pixels, with at least one of the plurality of pixels being configured to separately output an indication of a color value and an indication of a depth value.

To achieve the above and/or other aspects, one or more embodiments include an image sensor, including a plurality of pixels, wherein each pixel of the plurality of pixels includes a respective light-detector element and filter, with the respective filter being configured to band-pass a select incident visible light component to the respective light-detector element and band-pass a select incident non-visible light component to the respective light-detector element.

To achieve the above and/or other aspects, one or more embodiments include an imaging device, including a light source generating a non-visible light component, and a plurality of pixels, wherein each pixel of the plurality of pixels includes a respective light-detector element and filter, with the respective filter being configured to band-pass a select incident visible light component to the respective light-detector element and band-pass a select incident non-visible light component, having a defined relationship with the generated non-visible light component, to the respective light-detector element.

To achieve the above and/or other aspects, one or more embodiments include an image sensor, including at least one pixel, wherein the at least one pixel includes a first transferor that connects a light-detector element with a FD node, a driving unit that controls a voltage of a bit-line based on a voltage of the FD node and a row control signal, and a second transferor that connects the light-detector element with a sink line.

To achieve the above and/or other aspects, one or more embodiments include an imaging method, including sensing a first light component with a pixel during a first time period, and sensing at least a second light component with the pixel during a second time period, with the first light component having a different light characteristic than the second light component.

To achieve the above and/or other aspects, one or more embodiments include an imaging method, including sensing a first light component with a plurality of co-located pixels during a first time period, radiating a second light component based upon an ending of the sensing of the first light component, with the first light component having a different light characteristic than the second light component, sensing at least a reflection of the radiated second light component off an object using the plurality of co-located pixels during a second time period, and generating a depth image of the object from the sensed reflected light.

To achieve the above and/or other aspects, one or more embodiments include an image sensor method, including configuring at least one pixel as an image sensor, including configuring the at least one pixel to have a light-detector element and a band-pass filter, configuring the at least one pixel to have a first transferor that connects the light-detector element with a FD node, configuring the at least one pixel to have a bit-line signal line, a row signal line, and a driving unit such that the driving unit is configured to control a voltage of a bit-line signal on the bit-line signal line based on a voltage of the FD node and a row control signal on the row signal line, and configuring the at least one pixel to have a second transferor and a sink line, with the light-detector element being configured to connect with the sink line.

Additional aspects, features, and/or advantages of the invention will be set forth in part in the detailed description which follows and, in part, will be apparent from the detailed description, or may be learned by practice of the invention.

BRIEF DESCRIPTION OF THE DRAWINGS

These and/or other aspects, features, and advantages of the invention will become apparent and more readily appreciated from the following embodiments, taken in conjunction with the accompanying drawings of which.

DETAILED DESCRIPTION OF EMBODIMENTS

Figure 1:
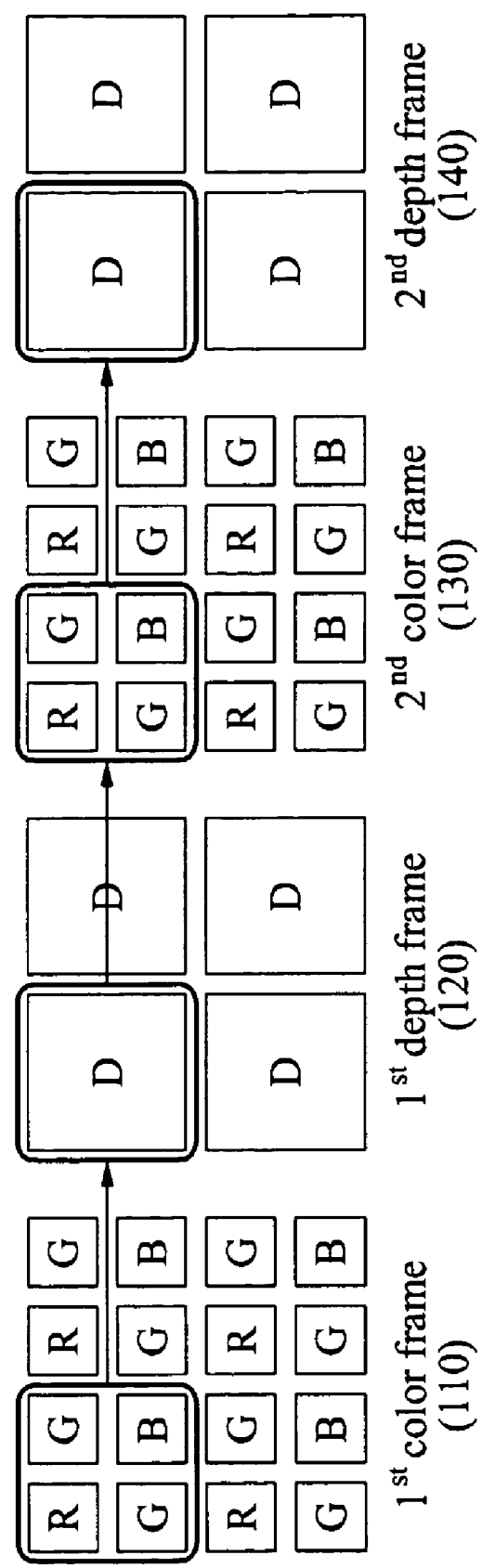
FIG. 1 illustrates operation of an image sensor, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 13:
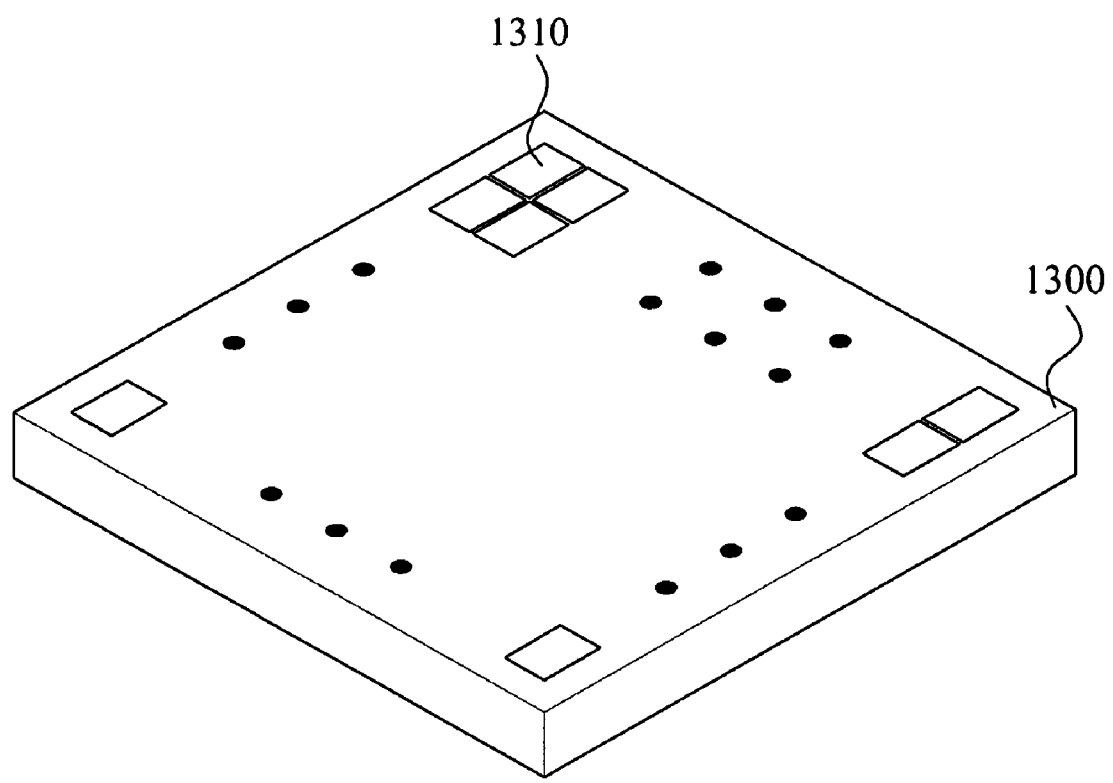
FIG. 13 illustrates an image sensor, according to one or more embodiments.

FIG. 13 illustrates an image sensor 1300, according to one or more embodiments.

Figure 14:
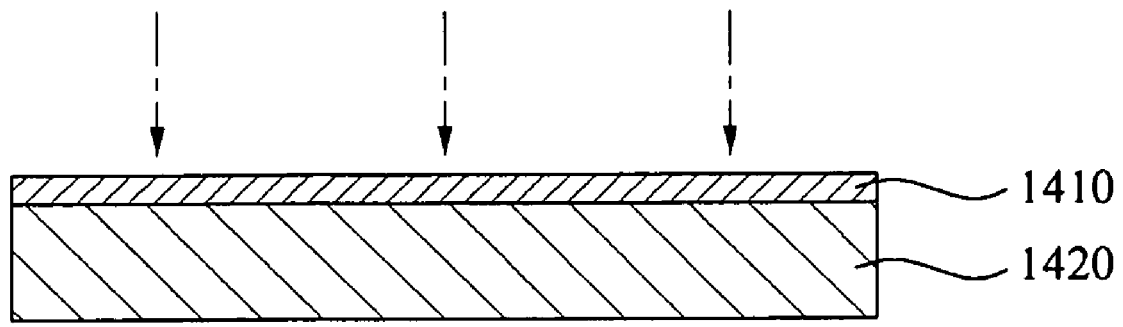
FIG. 14 illustrates an example of a cross section of the image sensor of FIG. 13, according to one or more embodiments.
Figure 15:
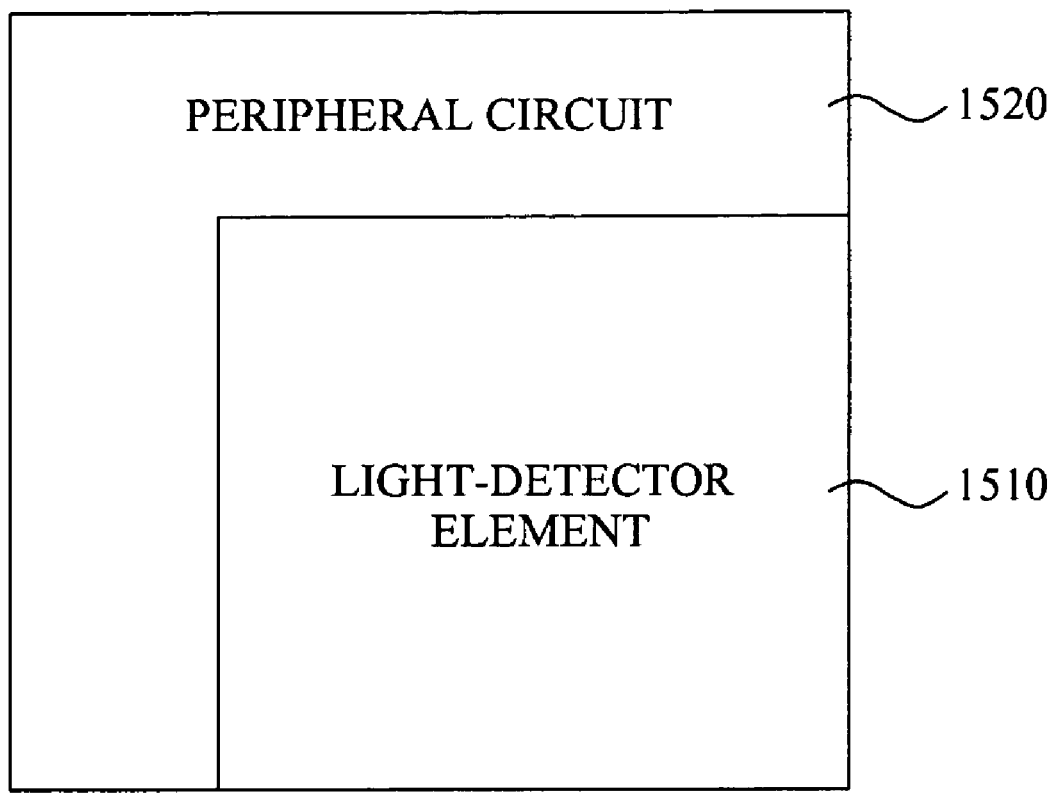
FIG. 15 illustrates an example of a plan view of the image sensor of FIG. 13, according to one or more embodiments.
Figure 16:
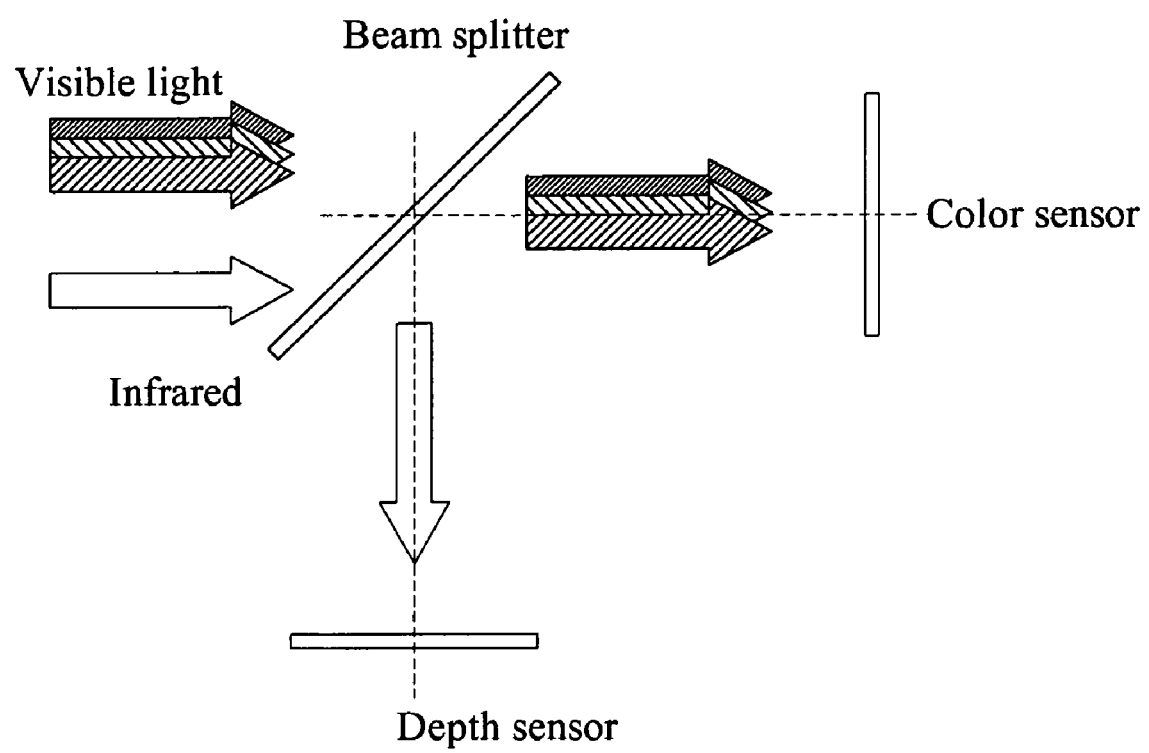
FIG. 16 illustrates a method for acquiring a color image and a depth image using a beam splitter with separate sensors for visible light and depth detection.
Figure 17A:
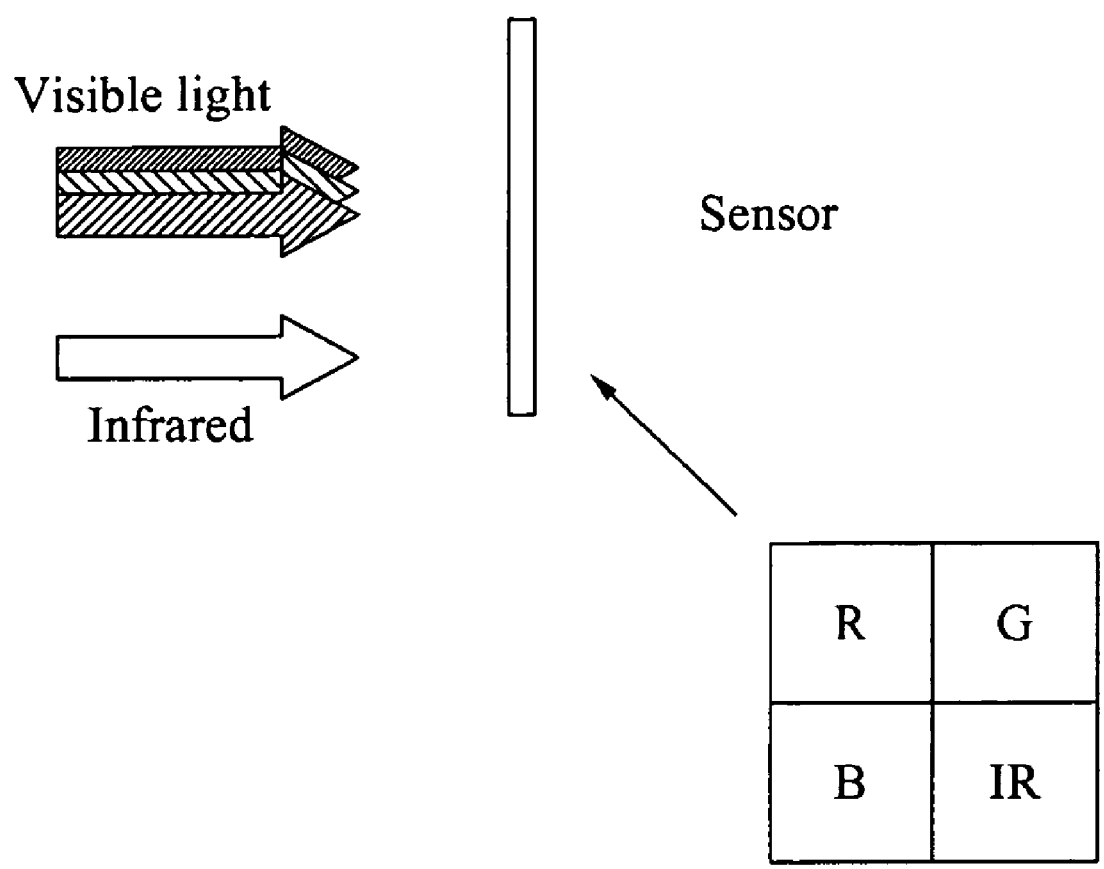
FIG. 17(a) illustrates a sensor in which pixels for sensing infrared light are dispersed over a conventional color sensor along side pixel for sensing visible light.
Figure 17B:
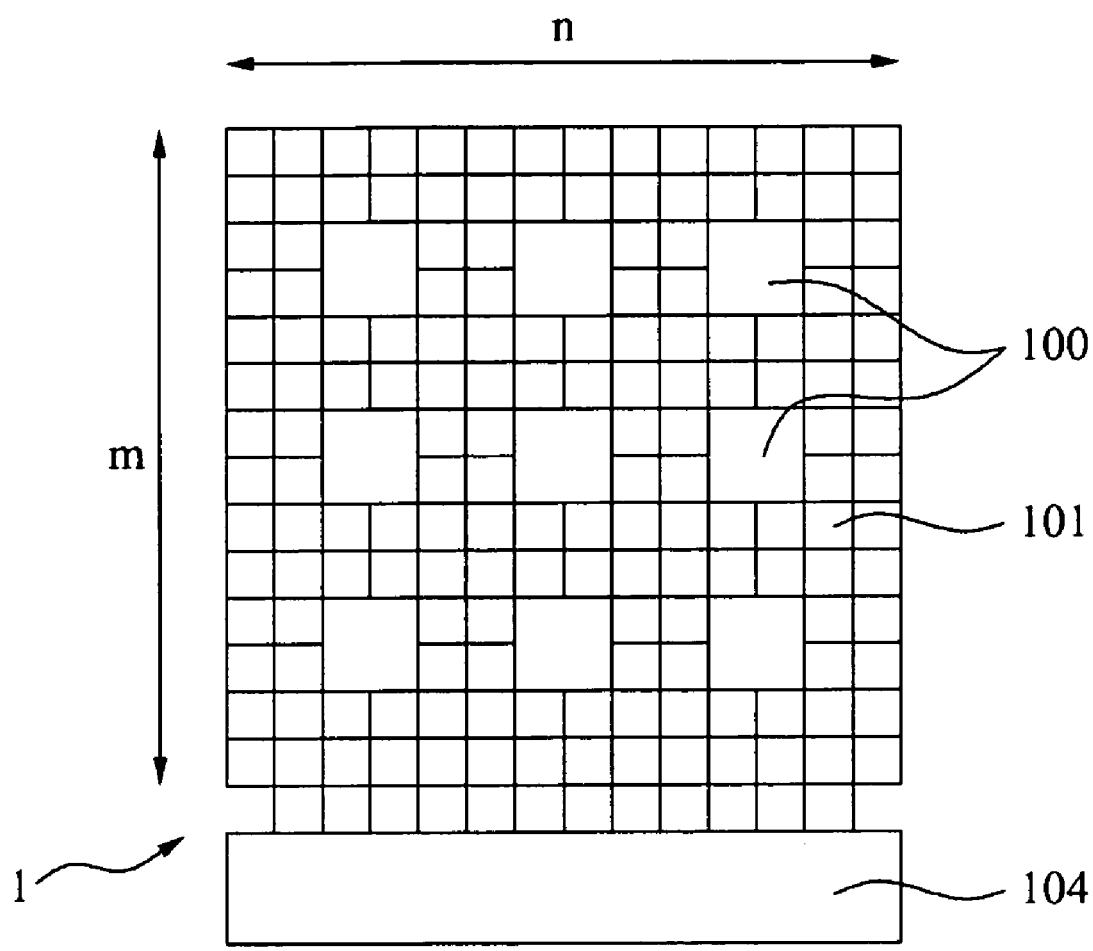
FIG. 17(b) illustrates a sensor where small-sized pixels measure the strength of visible light and large-sized pixels measure the return time of radiated infrared light to estimate a depth of an object.
Figure 17C:
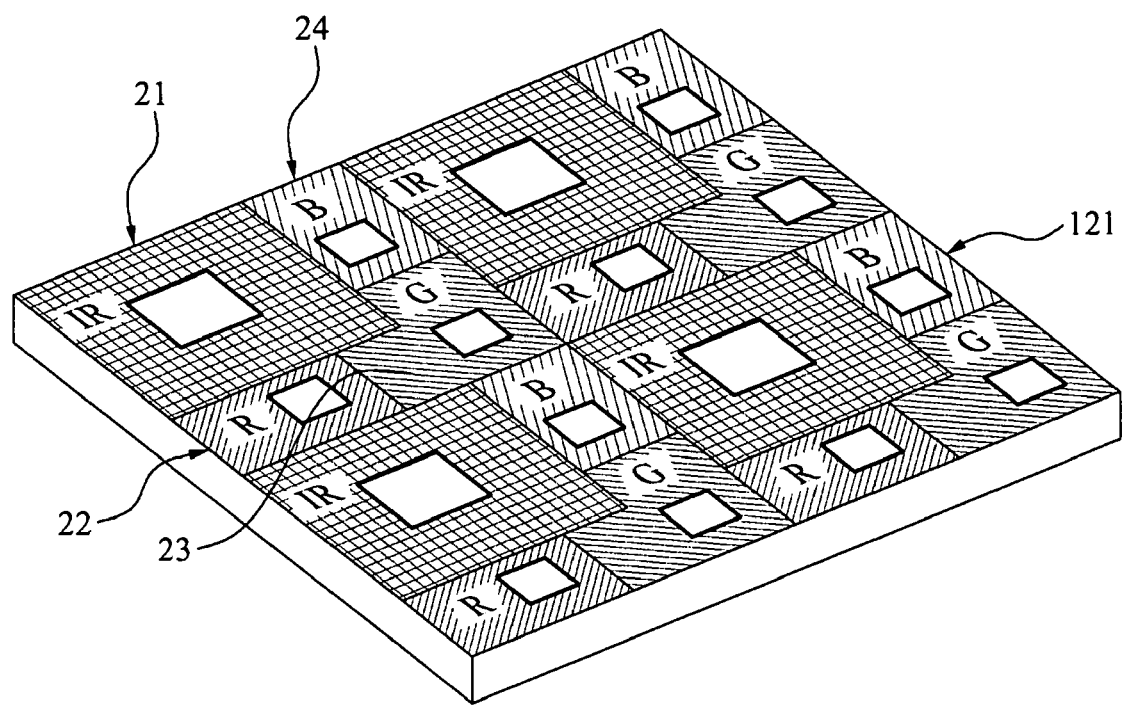
FIG. 17(c) illustrates a sensor where large-sized pixels sense infrared light and the remaining pixels respectively sense red, green, and blue respective bandwidths of light.

Referring to FIG. 13, the image sensor 1300 may include a plurality of pixels, such as pixel 1310, which is further illustrated in FIGS. 14-15.

The plurality of pixels may constitute an array. For example, if a row includes 240 pixels and a column includes 320 pixels, the image sensor 1300 could be referenced to as having a 320×240 resolution. In this instance, this 320×240 resolution image sensor could be further referenced to as being a pixel array. In an embodiment, depending on addressing techniques, each pixel of the image sensor 1300 may be accessed by a combination of a row address and column address, for example. In an example addressing technique, pixels included in a single column may be connected with a single bit line.

FIG. 14 illustrates a cross section example of the pixel 1310 of FIG. 13, according to one or more embodiments, showing an example filter 1410 and light-detector element 1420. The pixel may be an element with a single light-detector element, e.g., a single photo diode.

Here, as will be explained in further detail below, the filter 1410 may pass a select visible light component therethrough to the light-detector element 1420. In this instance, the filter 1410 may pass a specific band of the visible light component according to a type of the filter. For example, the filter 1410 may pass a band corresponding to red light, a band corresponding to green light, or a band corresponding to blue light, depending on a designed bandwidth filtering.

In an RGB environment, for example, the image sensor 1300 may include a red pixel including a red filter, a green pixel including a green filter, and a blue pixel including a blue filter. The red pixel, green pixel, and blue pixel may thereby be collectively used to define a color pixel of an image. In an embodiment, such related pixels may be adjacent to each other.

In addition, the filter 1410 may additionally band-pass non-visible light components therethrough to the light-detector element 1420. In one example, the filter 1410 could passes a band corresponding to infrared light from among the non-visible light therethrough to the light-detector element 1420. Thus, in addition to passing visible light components each pixel may further be designed to also pass non-visible light components or at least two different select light bands.

The light-detector element 1420 may generate charges in response to the light passed through the filter 1410. An example of the light-detector element 1420 may include a photo-diode.

FIG. 15 illustrates a plan view example of the pixel 1310 of FIG. 13.

Referring to FIG. 15, the pixel 1310 may include a light-detector element 1510 and a peripheral circuit 1520. The light-detector element 1510 may occupy more than half an area of the pixel 1310. The peripheral circuit 1520 may transfer light-detector electric current or light-detector charges generated by the light-detector element 1510 to a bit line, for example.

FIG. 1 illustrates an example operation of an image sensor, such as the image sensor 1300 of FIG. 13, according to one or more embodiments.

Referring to FIG. 1, 16 pixels of an image sensor are illustrated. This illustration of the image sensor should be considered a co-location of plural photo sensing pixels, where a pixel value obtained based on each pixel may eventually be correlated to a corresponding arranged pixel of an image. As only an example, pixel value information for plural pixels representing different colors within the photo sensor may be correlated to a single pixel of such an image; as discussed below, such an arrangement could collect red, green, and blue color information from at least three respective photo sensing pixels and that color information could be combined to represent the red, green, and blue characteristics of a single pixel of an image. Embodiments of the present invention are further not limited to a single image sensor, but may include the use of plural image sensors, each with one or more co-located photo sensing pixels.

The pixels represented by "R" are used to obtain a pixel value with respect to a red color, pixels represented by "G" are used to obtain a pixel value with respect to a green color, and pixels represented by "B" are used to obtain a pixel value with respect to a blue color. Here, each pixel represented by "D" is a collection or grouping of such R, G, or B pixels and is used to obtain respective depth values. The image sensor should not be limited to requiring such differing color or bandwidth passing pixels, but rather, the pixels may all have the same color or bandwidth or more or less colors or bandwidths desired for generation of an image, for example, briefly noting that information collected from such pixels may be used for other purposes than image generation. Further, not all differing color or bandwidth passing pixels would be required to be activated in any single image generation, e.g., potentially only R pixels may be activated, in which case one or more R pixels could then be used collectively to obtain the depth image. Here, again, alternative embodiments are equally available and embodiments of the present invention should not be limited to the embodiments or examples discussed herein.

A first color frame 110 represents a state when the image sensor obtains a pixel image with respect to red, green, or blue colors. In this instance, as only an example, a single "R" pixel, a single "B" pixel, and two "G" pixels may form a single resultant color pixel. Since, generally, eyes of the human being are more highly sensitive to the green color, two "G" pixels are usually used. This is called a Bayer pattern.

A first depth frame 120 represents a state when the image sensor obtains a depth image. In this instance, as only an example, the same neighboring four pixels that form a single color pixel may again be used, but in this instance they are used to form a single depth pixel. The example four pixels that may be used to form the single color pixel of an image may thus form a single pixel group, briefly noting that the term group should not be considered as limiting the grouping of pixels to always being neighboring pixels, as the pixels making up a pixel group may not be required to be adjacent to each other. Since the infrared light sensitivity of photodiodes is typically lower than the visible light sensitivity of the same photodiodes, the image sensor may obtain a single depth image from the example single pixel group, as a whole. Thus, even when the infrared sensitivity of the photodiode is significantly lower that the visible light sensitivity, the image sensor may still obtain the depth image without requiring a larger size photodiode, as conventionally required. Accordingly, as shown in FIG. 1, the same pixels that conventionally may have only been used to generate only respective color pixel values may be further used, e.g., in a different frame, to also generate a depth pixel value. In the example shown in FIG. 1, four such pixels are collectively referred to as a pixel group and in a first frame each pixel of that pixel group is used to generate a color pixel value for respective visible light bands and each pixel of that pixel group may further be used collectively to generate a depth pixel value.

Although the pixel array of FIG. 1 illustrates the Bayer pattern, based on the red color, green color, and blue color, embodiments should not be limited to the same and may use various filter patterns. For example, a CMY color pattern based on a cyan color, magenta color, and yellow color may equally be used, again noting that alternatives are equally available.

In addition, although FIG. 1 illustrates an operation where the pixel array obtains the depth image using infrared light that is reflected by an object after being radiated from a light source, for example, embodiments should not be limited to the same and an image sensor according to another exemplary embodiment may obtain a depth image using a light of a specific band selected based on a combination with its color pattern, for example. Still further, though embodiments refer to the pixels of the image sensor as being used to detect color and depth, embodiments should again not be so limited, as a sensor having select pixels with the dual characteristics of detecting two distinct bands of light, e.g., through different frames, is equally available for differing purposes than image generation and/or depth measurement.

Referring to FIG. 1, the second color frame 130 represents another example state when the image sensor obtains a pixel image with respect to a red color, green color, or blue color, and the second depth frame 140 represents the state when the image sensor obtains a depth image. Here, though alternating states are shown, embodiments should not be limited to the same, as other timing techniques could equally be implemented for differing purposes.

In an embodiment, each pixel may include a light-detector element and a filter. In such an embodiment, a pixel R may include a filter that passes a red light and infrared light, a pixel G may include a filter that passes a green light and infrared light, and a pixel B may include a filter that passes a blue light and infrared light.

Each pixel may perform the obtaining of the pixel image with respect to a red color, green color, or blue color during the time corresponding to the first color frame 110, and may thereafter perform the obtaining of the depth image during the time corresponding to the first depth frame 120. During the first color frame 110, since each pixel may pass the infrared light as well as the respective red color, green color, or blue light, sensed information generated by the light respectively passed through each pixel may include noise from the infrared light. Here, the reference to the incident infrared light being noise is with respect to the purpose of the first color frame to collect color information. When the noise from the infrared light is small, color information may be obtained based directly on sensed information, for example. Conversely, for example, when there is a determination that there is a need to eliminate the noise from the infrared light, sensed information from which the noise from the infrared light is eliminated through an appropriate procedure may be generated and color information based on the generated sensed information may be obtained. This process may also be automatically performed. As only an example of defining the "noise" of infrared light within a color image detection frame, a comparison of pixels and pixel groups between respective adjacent color and depth frames may be helpful in discerning between intensities of light from visible light and non-visible light to determine the amount of infrared light that may be incident during the color image detection frame. In the same manner, such an operation of eliminating the noise with respect to the sensed information can be referred to as a post-process. In an embodiment, the post-process that eliminates the noise of the infrared light occurring during the color image detection may also be performed at the same time as the first color frame 110.

In the example embodiment of FIG. 1, each pixel performs the obtaining of the depth image during a time corresponding to a first depth frame 120. Since each pixel may pass infrared light that is reflected by an object, e.g., after being radiated from the imaging device as well as infrared light independent from the above-described route, respective red, green, or blue light, sensed information generated by the reflected light respectively passed through each pixel may include corresponding noise from respective red, green, or blue light filtering. In an embodiment, the image sensor may eliminate the noise from the red, green, or blue light with respect to the sensed information during the time corresponding to the first depth frame 120. For example, the image sensor may obtain sensed information from infrared light that is reflected by the object after being radiated from the imaging device, using the sensed information obtained during the time corresponding to the first color frame 110, namely, the sensed information that has not been processed by the post-process, from the sensed information obtained during the time corresponding to the first depth frame 120, and thus the image sensor may obtain depth information based on the sensed information.

It is also possible to use an average value as sensed information, the average value being calculated by averaging the sensed information obtained during the time corresponding to the first color frame 110 and the first depth frame 120.

Thus, the image sensor may perform a color mode operation and a depth mode operation using a same pixel. Since the image sensor may not require an additional pixel or circuit for obtaining the depth image, it may decrease an area of the image sensor and increase pixel resolution compared to conventional image sensors. Also, the image sensor may obtain a single depth image from a plurality of pixels, thereby increasing sensitivity to infrared light and SNR of the depth image. In this instance, only for convenience of description, it is assumed that the time period corresponding to the color frame during which the color information is obtained is a first time period and the time period corresponding to the depth frame is a second time period. The image sensor may generate one 3D image frame using the color information and depth information obtained during the first time period and the second time period. After generating the one 3D image frame, the image sensor may further repeat the first time period and second time period to obtain another 3D image frame. Again, the referenced first and second time periods are introduced merely for convenience of description and should not be interpreted as limiting embodiments to the same.

Depending on embodiments, the plurality of pixels may share a portion of a detecting circuit, thereby decreasing an area of the image sensor compared to conventional image sensors.

Figure 2:
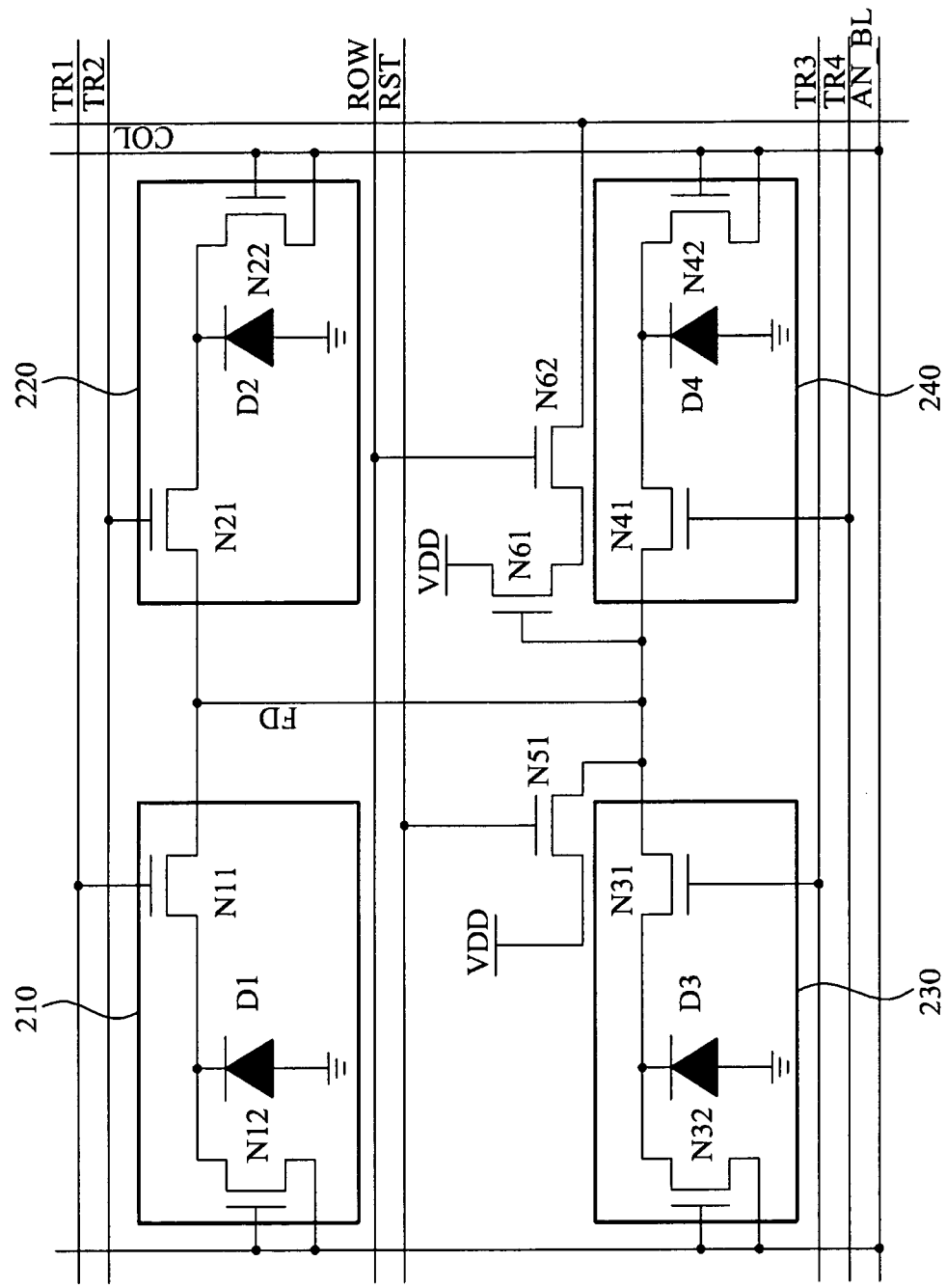
FIG. 2 illustrates a part of an equivalent circuit of an image sensor, according to one or more embodiments.

FIG. 2 illustrates an example portion of an equivalent circuit of an image sensor, according to one or more embodiments.

Referring to FIG. 2, an equivalent circuit that corresponds to four pixels is illustrated.

The illustrated RST signal is an example signal used to perform a reset operation and the ROW signal is an example signal to indicate that a row of an array is selected. The illustrated TR1, TR2, TR3, and TR4 signals are further example signals to control a transfer operation for respective pixels 210, 220, 230, and 240.

The illustrated COL node is an example bit line corresponding to a column of the array and the illustrated AN_BL node may be controlled complementarily to the TR1, TR2, TR3, and TR4 signals during depth image generation, for example.

The pixel 210 may be configured to have a photodiode D1, a first transfer transistor N11, and a second transfer transistor N12; the pixel 220 may be configured to have a photodiode D2, a first transfer transistor N21, and a second transfer transistor N22; the pixel 230 may be configured to have a photodiode D3, a first transfer transistor N31, and a second transfer transistor N32; and the pixel 240 may be configured to have a photodiode D4, a first transfer transistor N41 and a second transfer transistor N42. Herein, embodiments include the configuring or production of such a portion of the equivalent circuit of the image sensor or the image sensor as a whole, e.g., the provision of elements in a semiconductor device or semiconductor producing environment to generate example pixels 210, 220, 230, and 240, as one of ordinary skill in the art would understand their ultimate configurations and components and processes for fabricating a semiconductor device accordingly to accomplish aspects set forth in the present disclosure. FIG. 2 can thus be further considered an illustration of such a semiconductor device, with the below discussed FIG. 3, for example, illustrating the same in more detail.

In an embodiment, the four pixels 210, 220, 230, and 240 may further be configured to share a reset transistor N51, source follower N61, and selective transistor N62.

The first transfer transistor N11 of the pixel 210 may be configured to transfer charges generated by the photodiode based on the TR1 signal to a Floating Diffusion (FD) node. In this instance, the first transfer transistor N11 may be configured to selectively connect photodiode D1 with the FD node or disconnect the photodiode D1 from the FD node based on the TR1 signal, for example. For example, the first transfer transistor N11 may operate as an electric shutter.

The photodiode of the pixel 210 may thus sense light. The photodiode D1 may be combined with a specific filter to selectively sense light of a specific wavelength band(s). Thereafter, the photodiode D1 may generate an Electron Hole Pair (EHP), for example, based on the sensed light.

A gate terminal of the first transfer transistor N11 may be configured to be connected with the TR1 signal and a drain terminal of the first transfer transistor N11 may be configured to be connected with the photodiode D1, and further a source terminal of the first transfer transistor N11 may be configured to be connected with the FD node.

Depending on embodiment, the photodiode D1 may be a general photodiode (n+/psub structure) or a PINNED photodiode (p+/n/psub structure). The PINNED photodiode may maintain a PINNING voltage and decrease a dark current when operated.

Thus, the photodiode D2 of the pixel 220 may be configured to generate an EHP based on the sensed light, with the first transfer transistor N21 of the pixel 220 being potentially configured to transfer charges generated by the photodiode D2 based on the TR2 signal to the FD node. In this instance, the first transfer transistor N21 may selectively connect the photodiode D2 and FD node or disconnect the photodiode D2 from FD node based on the TR2 signal.

A gate terminal of the first transistor N21 of the pixel 220 may be configured to be connected with the TR2 signal, a drain terminal of the first transfer transistor N21 may be configured to be connected with the photodiode D2, and further a source terminal of the first transistor N21 may be configured to be connected with the FD node.

Likewise, the photodiode D3 of the pixel 230 may be configured to generate an EHP based on the sensed light. The first transfer transistor N31 of the pixel 230 may be configured to transfer charges generated by the photodiode D3 based on the TR3 signal to the FD node. In this instance, the first transfer transistor N31 may selectively connect the photodiode D3 with the FD node or disconnect the photodiode D2 from FD node based on the TR3 signal.

A gate terminal of the first transistor N31 of the pixel 230 may be configured to be connected with the TR3 signal, a drain terminal of the first transfer transistor N31 may be configured to be connected with the photodiode D3, and a source terminal of the first transistor N31 may be configured to be connected with the FD node.

The photodiode D4 of the pixel 240 may be configured to generate an EHP based on the sensed light. The first transfer transistor N41 of the pixel 240 may be configured to transfer charges generated by the photodiode D4 based on the TR4 signal to the FD node. In this instance, the first transfer transistor N41 may, again, selectively connect the photodiode D4 with the FD node or disconnect the photodiode D4 from the FD node based on the TR4 signal.

A gate terminal of the first transistor N41 of the pixel 240 may be configured to be connected with the TR4 signal, a drain terminal of the first transfer transistor N41 may be configured to be connected with the photodiode D4, and a source terminal of the first transistor N41 may be configured to be connected with the FD node.

In addition, a gate terminal of the source follower N61 may be configured to be connected with the FD node, a drain terminal of the source follower N61 may be configured to be connected with a power VDD, and a source terminal of the source follower N61 may be configured to be connected with the selecting transistor N62.

The voltage of the source terminal of the source follower N61 may be determined based on a voltage of the FD node. The voltage of the FD node may further be configured to be defined according to an amount of charges transferred from at least one of pixels 210, 220, 230, and 240.

In this example, the gate terminal of the selecting transistor N62 may be configured to be connected with a row control signal, namely, the example ROW signal, the drain terminal of the selecting transistor N62 may be configured to be connected with a source terminal of the source follower N61, and a source terminal of the selecting transistor N62 may be connected with the example COL node, namely, the bit line.

Here, the row control signal ROW may indicate that the FD shared by pixels 210, 220, 230, and 240 is selected. When the row control signal ROW is activated, the source follower N61 and selecting transistor N62 may drive the bit line based on the voltage of the FD node.

A gate terminal of the reset transistor N51 may, thus, be configured to be connected with the RST signal, a drain terminal of the reset transistor N51 may be configured to be connected with the power VDD, and a source terminal of the reset transistor may be configured to be connected with the FD node.

After detection of pixel information based on the voltage of the FD node is performed, and upon the RST signal being activated, the reset transistor N51 may be configured to reset the voltage of the FD node as the power VDD.

With such an arrangement, an additional procedure for obtaining the depth image is as follow. As described above, the time period corresponding to a depth frame during which the image sensor obtains the depth image is referred to as the second time period.

The pixels 210, 220, 230, and 240 may transfer charges generated based on the sensed light to the FD node. In this instance of obtaining the depth image, the TR1, TR2, TR3, and TR4 signals may be activated at the same time.

For convenience of description, in this depth image obtaining process of the second time period, the time period when the TR1, TR2, TR3, and TR4 signals are all activated can further be referred to as an active time period. Conversely, the time period in the second time period when the TR1, TR2, TR3, and TR4 signals are all deactivated can be referred to as an inactive time period. The active time period and inactive time period may thus be time periods within the example second time period corresponding to the depth frame.

An image sensor device, e.g., a device including the sensor or an image sensor with a infrared radiating capability, such as a correspondingly configured camera, may radiate infrared light to obtain distance information to an object. The image sensor device may periodically perform radiating and non-radiating of the infrared light at least one time, for example.

Figure 5:
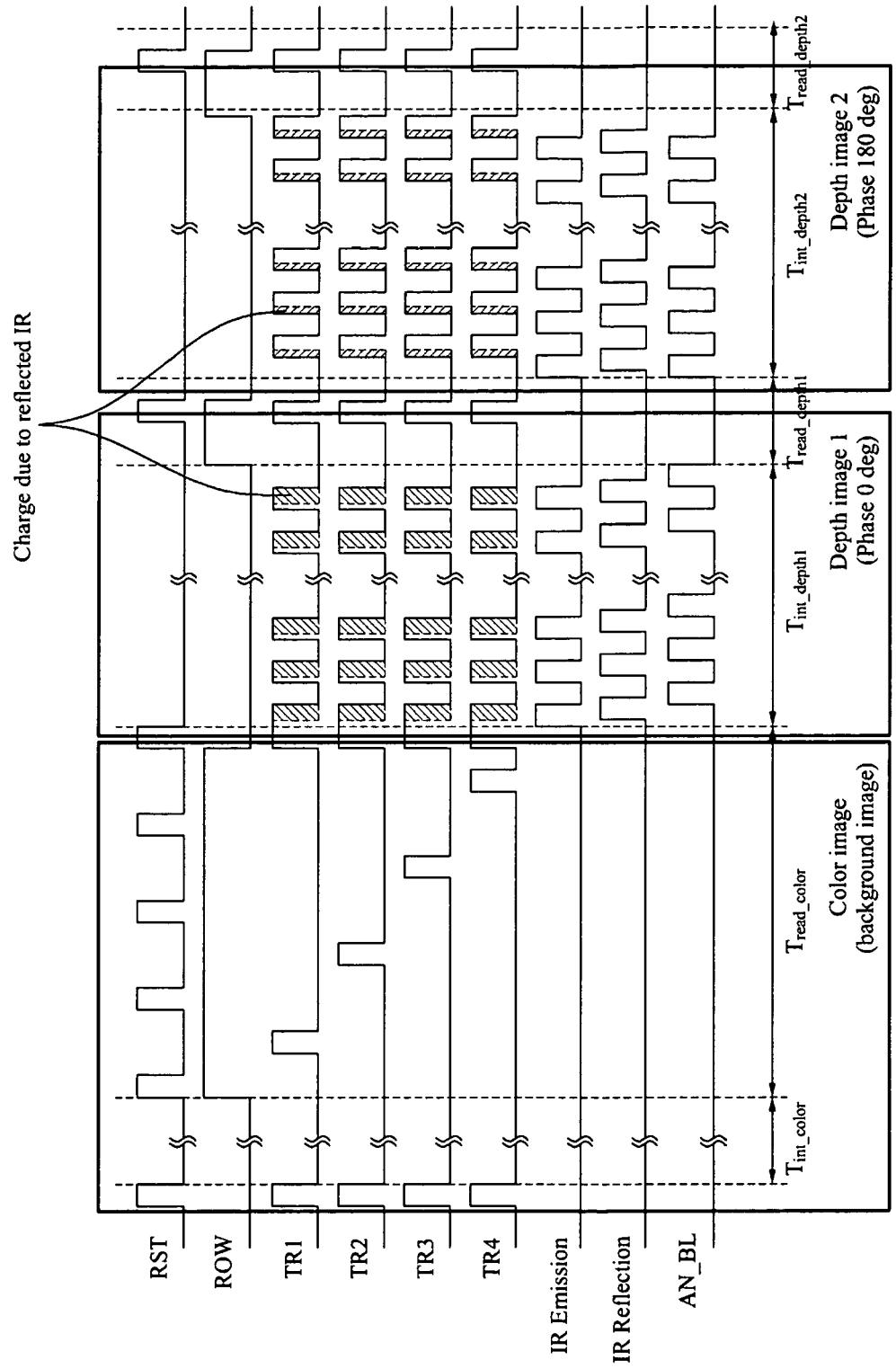
FIG. 5 is a timing diagram illustrating an example operation of an image sensor, such as that of FIG. 2, according to one or more embodiments.

A phase difference may be set between the infrared-radiating time period and the active time period to zero degrees, 90 degrees, 180 degrees, and the like, as only an example, to obtain the depth image. For example, as illustrated in FIG. 5, the image sensor may match the infrared-radiating time period to the active time period and may match the infrared non-radiating time period to the inactive time period. In this instance, the image sensor may sense reflected infrared light and obtain first information. After the first information is obtained, the image sensor may match the infrared-radiating time period to the inactive time period (herein, the infrared-radiating time period having a 180 degree phase difference from the infrared non-radiating time period) and may match the infrared non-radiating time period to the active time period. In this instance, the image sensor may sense reflected infrared light and obtain second information. The image sensor may then obtain the depth image based on the first information and second information. This method may be called an indirect depth image generating method.

The photodiodes D1 to D4 may sense the reflected infrared light and generate the EHP based on the sensed infrared light. In such an example, the first transistors N11, N21, N31, N41 of pixels 210, 220, 230, and 240 may transfer the charges generated by the photodiodes D1, D2, D3, and D4 to the FD node during the active time period. The second transfer transistors N12, N22, N32, and N42 of the pixels 210, 220, 230, and 240 may transfer charges generated by the photodiodes D1, D2, D3, and D4 to the AN_BL node during the inactive time period. The image sensor may maintain a voltage of the AN_BL node as a power voltage VDD during the inactive time period.

A portion of the EHP generated by the reflected infrared light may be transferred to the FD node during the active time period and the rest of the EHP may be transferred to the AN_BL node. A time difference between a time when an infrared light is radiated and a time when a reflected infrared light is sensed is referred to as a time of flight (TOF). Thus, a ratio of an amount of the EHP transferred to the FD node during the active time period to an amount of the EHP generated by the reflected infrared light may correspond to the TOF.

The image sensor may, thus, transfer the EHP generated by the infrared light sensed during the inactive time period to the AN_BL node. In this instance, the AN_BL node may be shared by the plurality of pixels. The AN_BL node may operate as a sink path of the EHP that is not used to generate the depth image.

Since the second transistors N12, N22, N32, and N42 may sink or dump the EHP that is not used to generate the depth image during the inactive time period, sizes of the second transistors N12, N22, N32, and N42 may be smaller than that of the first transfer transistors N11, N21, N31, and N41.

The image sensor may also store the charges generated by the four pixels 210, 220, 230, and 240 while the depth image is obtained, and thereby can increase a sensitivity and SNR of the depth image even with a low infrared light sensitivity of the photodiodes D1, D2, D3, and D4.

According to an exemplary embodiment, the infrared light may be radiated within an extremely short time period compared to the active time period and the image sensor may sense reflected infrared light to obtain the depth image. In this instance, the image sensor may sense the reflected infrared light and generate charges based on the sensed infrared light. The generated charges may be output via the FD node and bit line immediately. The image sensor may directly obtain information about a difference between a time when a voltage of the bit line is changed and a time when the infrared light is radiated, using a time to digital converter and the like. The image sensor may obtain the TOF based on the time difference information. The method that can obtain the depth image without an additional calculating operation may be considered a direct depth image generating method.

The image sensor may equally obtain a color image using the pixels 210, 220, 230, and 240 without radiating the infrared light.

The image sensor may obtain a red color image using the pixel 210. In a time period of obtaining the red color image, the TR1 signal may be activated and the TR2, TR3, and TR4 signals may be kept deactivated. In this instance, the photodiode D1 may be combined with a band-pass filter to thereby sense the red color and infrared light.

The image sensor may obtain a green color image 1 using the pixel 220. In a time period of obtaining the green color image 1, TR2 signal may be activated and the TR1, TR3, and TR4 signals may be kept deactivated. In this instance the photodiode D2 may be combined with a band-pass filter to thereby sense the green color and infrared light.

The image sensor may obtain a green color image 2 using the pixel 230. In a time period of further obtaining the green color image 2, TR3 signal may be activated and the TR1, TR2, and TR4 signals may be kept deactivated. In this instance the photodiode D3 may be combined with a band-pass filter to thereby sense the green color and infrared light.

The image sensor may obtain a blue color image using the pixel 240. In a time period of obtaining the blue color image, TR4 signal may be activated and the TR1, TR2, and TR3 signals may be kept deactivated. In this instance the photodiode D4 may be combined with a band-pass filter to thereby sense the blue color and infrared light.

The image sensor may prevent a blooming phenomenon using the second transistors N12, N22, N32, and N43 while obtaining the color image. Such a blooming phenomenon may occur when incident light is extremely strong.

The pixels of the image sensor may include the aforementioned first transfer transistor and the second transfer transistor and the four pixels of the image sensor may share the reset transistor and two selective driving transistors. Accordingly, in an embodiment, each pixel may be regarded as including 2.75 transistors.

According to an embodiment, a light of a specific band may be radiated to obtain the depth image of an object and the image sensor may sense reflected light when the radiated light is reflected by the object. The light radiated to obtain the depth image may not be limited to the infrared light and may be determined based on a characteristic of the filter that is combined with the pixels.

Although a format that the four pixels share the single FD node and transistors is illustrated in FIG. 2, depending on exemplary embodiments, an alternate number of pixels that share the single FD node may be determined according to spatial resolution of the depth image.

In an embodiment, to transfer charges generated by the photodiode D1 to the FD node, a phase difference between the drain terminal of the transistor N11, which is connected with the photodiode D1, and the FD node is desirably maintained. When a voltage of the drain terminal of the N11 and a voltage of the FD node are changed while the charges generated by the photodiode D1 are transferred, all the charges generated by the photodiode D1 may not be transferred to the FD node. Based on the above mentioned reason, a sensitivity of the photodiode D1 may decrease.

Since a voltage of the photodiode D1 may be determined to be below the PINNING voltage according to intensity of radiation when the photodiode D1 is the PINNED photodiode, the voltage of the photodiode D1 may be lower than the voltage of the FD node. Accordingly, when the photodiode D1 is the PINNED photodiode, all the charges generated by the photodiode D1 may be transferred to the FD node while the TR1 is activated. In this instance, the sensitivity of the photodiode D1 may increase.

Figure 3:
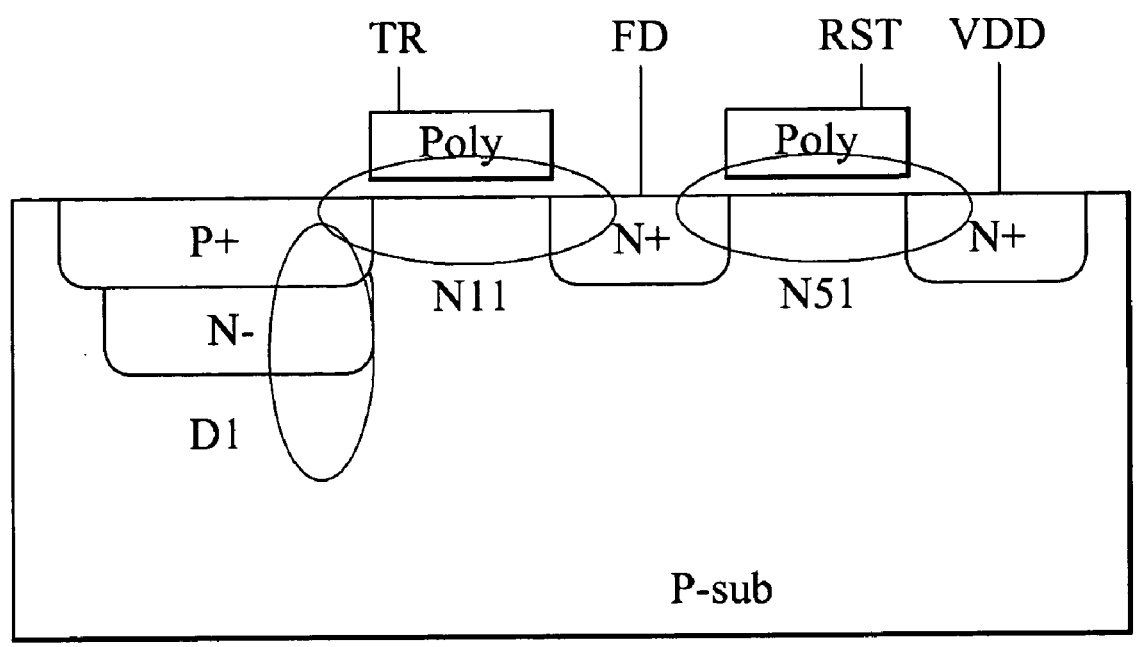
FIG. 3 illustrates a partial cross section of an example of a semiconductor device corresponding to the equivalent circuit of FIG. 2, according to one or more embodiments.

FIG. 3 illustrates a partial cross section of an example of a semiconductor device corresponding to the equivalent circuit of FIG. 2, according to one or more embodiments.

Referring to FIG. 3, the photodiode D1 of FIG. 2 is an example PINNED photodiode, which is in a structure of P+/N-/P-substrate.

Referring to FIG. 3, the gate terminal of the transistor N11 of FIG. 2 may be configured to be connected with a TR signal. The source terminal of the transistor N11 may be configured to be connected with the FD node.

Referring to FIG. 3, the gate terminal of the reset transistor N51 of FIG. 2 may further be configured to be connected with a RST signal, a drain terminal of the N51 may be configured to be connected with a power supply VDD, and the source terminal of the N51 may be configured to be connected with the FD node.

Figure 4:
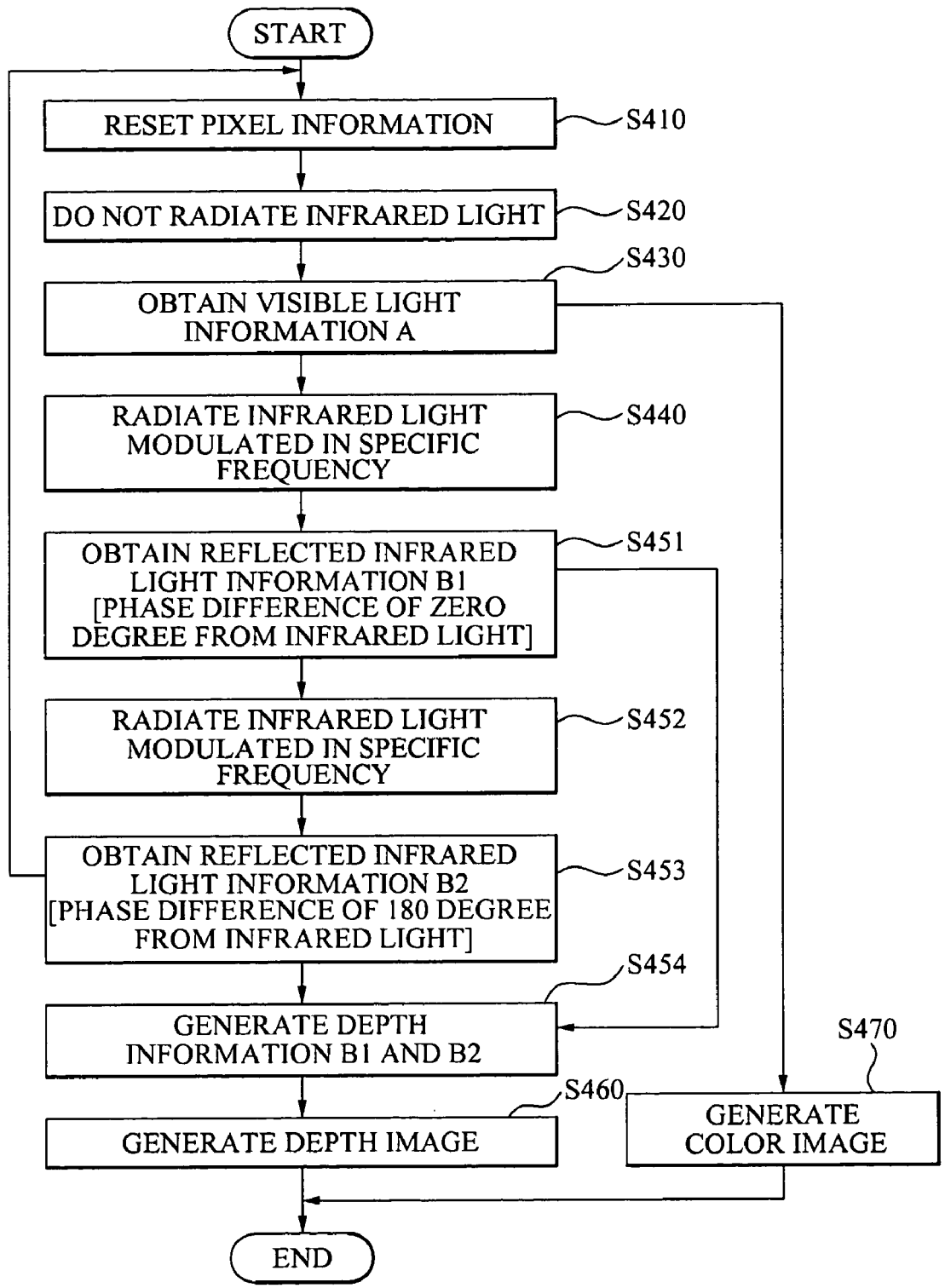
FIG. 4 is a flowchart illustrating a controlling method of an imaging device including a light source and image sensor, according to one or more embodiments.

FIG. 4 is a flowchart illustrating a controlling method of an imaging device including a light source and image sensor, such as a camera system, according to one or more embodiments of the present invention.

Referring to FIG. 4, the control method may reset pixel information, in operation S410.

After the resetting in operation S410, there may be a maintenance of the infrared light not being radiated during the time period corresponding to a color frame, in operation S420.

Visible light information A may be obtained based on light sensed, e.g., again without radiating the infrared light, in operation S430. As described above, the obtaining of visible light information in operation S430 may include an appropriate post-procedure that may eliminate noise of the infrared light.

Operations S410 to S430 may be performed during the above-described first time period, and in operation S470, the color image may be generated based on the visible light information A obtained in operation S430.

After obtaining the visible light information A, in operation S430, a light source of an imaging device may radiate infrared light in operation S440, with the infrared light being modulated at a specific frequency. Infrared light information B1 reflected by an object may then be obtained, in operation S451. In this instance, and as only an example, operation S451 may be performed by a pulse having a phase difference of zero degrees from the pulse in operation S440.

After performing operation S451, the light source of the imaging device may radiate infrared light that is modulated at the specific frequency, in operation S452.

Reflected infrared light information B2 may be obtained, in operation S453. In this instance, as an example, operation S453 may be performed by a pulse having a phase difference of 180 degrees from the pulse in operation S452.

Depth information may thereby be generated based on the reflected infrared light information B1 and B2, in operation S454. As described above, the generating of the Depth information in operation S454 may include an operation of eliminating noise of the visible light and infrared light that may not be radiated from the light source.

Operations S440 to S454 may be performed during a second time period and the depth image may be generated based on the depth image information generated in operation S454.

Operations S460 and S470 may, for example, be performed during the second time period and performed during a first time period of a next image frame.

Operations S410 to S430 of obtaining the visible light information A and/or operations S440 to S454 of generating reflected infrared light information B1 and B2 may be repeatedly performed and an average of values obtained by the repeatedly performed operations may be used as a resultant determined visible light information A and the infrared light information B1 and B2.

FIG. 5 is a timing diagram illustrating only an example operation of an image sensor, such as the image sensor of FIG. 2, according to one or more embodiments.

Referring to FIG. 5, the image sensor may activate RST, TR1, TR2, TR3, and TR4 signals to reset pixels 210, 220, 230, and 240 before obtaining a color image.

The image sensor may store charges in a parasitic capacitance of each of photodiodes D1, D2, D3, and D4, with the charges being generated by sensed light during integration time $T_{int\_color}$.

After the $T_{int\_color}$, color obtaining time $T_{read\_color}$ may start. The $T_{int\_color}$ and $T_{read\_color}$ may form a first time period, which corresponds to a color frame.

After the $T_{read\_color}$, the image sensor may activate the ROW signal and the RST signal to reset a FD node. The image sensor may detect a voltage $V_{rst\_color}$ (1) of the FD node at that time. The $V_{rst\_color}$ (1), which is an offset voltage of the reset FD node, may be used to obtain color information where an effect of noise is eliminated.

The image sensor may activate TR1 signal to transfer the charges stored in the parasitic capacitance of the photodiode D1 to the FD node, after detecting the $V_{rst\_color}$ (1). The image sensor may detect voltage $V_{sig\_color}$ (1) of the FD node of that time. When the photodiode D1 is combined with a red color filter, the voltage $V_{sig\_color}$ (1) may be raw data corresponding to a red color image, for example.

After detecting the $V_{sig\_color}$ (1), the image sensor may activate the RST signal to reset the FD node. The image sensor may detect $V_{rst\_color}$ (2) of the FD node at that moment. The $V_{rst\_color}$ (2) may be another offset voltage.

After detecting the $V_{rst\_color}$ (2), the image sensor may activate TR2 signal and transfer the charges stored in a parasitic capacitance of the photodiode D2 to the FD node. The image sensor may detect voltage $V_{sig\_color}$ (2) of the FD node at that time. When the D2 is combined with a green filter, the voltage $V_{sig\_color}$ (2) may be raw data corresponding to a green color image, for example.

After detecting the $V_{sig\_color}$ (2), the image sensor may activate the RST signal to reset the FD node. The image sensor may detect $V_{rst\_color}$ (3) of the FD node in an instant. The $V_{rst\_color}$ (3) may be another offset voltage.

After detecting the $V_{rst\_color}$ (3), the image sensor may activate TR3 signal and transfer the charges stored in a parasitic capacitance of the photodiode D3 to the FD node. The image sensor may detect voltage $V_{sig\_color}$ (3) of the FD node at that time. When the D3 is combined with a green filter, the voltage $V_{sig\_color}$ (3) may be raw data corresponding to a green color image, for example.

After detecting the $V_{sig\_color}$ (3), the image sensor may activate the RST signal to reset the FD node. The image sensor may detect $V_{rst\_color}$ (4) of the FD node at that moment. The $V_{rst\_color}$ (4) may be another offset voltage.

After detecting the $V_{rst\_color}$ (4), the image sensor may activate TR4 signal and transfer the charges stored in a parasitic capacitance of the photodiode D4 to the FD node. The image sensor may detect voltage $V_{sig\_color}$ (4) of the FD node at that time. When the D4 is combined with a blue filter, the voltage $V_{sig\_color}$ (4) may be raw data corresponding to a blue color image, for example.

In an embodiment, the image sensor may perform a correlated double sampling on the detected $V_{rst\_color}$ (1) and $V_{sig\_color}$ (1) and may calculate a difference between the detected $V_{rst\_color}$ (1) and $V_{sig\_color}$ (1). The image sensor may obtain a red color image based on the calculated difference.

In the same manner, the image sensor may perform a correlated double sampling on the detected $V_{rst\_color}$ (2) and $V_{sig\_color}$ (2) and may calculate a difference between the detected $V_{rst\_color}$ (2) and $V_{sig\_color}$ (2). Also, the image sensor may perform a correlated double sampling on the detected $V_{rst\_color}$ (3) and $V_{sig\_color}$ (3) and may calculate a difference between the detected $V_{rst\_color}$ (3) and $V_{sig\_color}$ (3). The image sensor may obtain a green color image based on the calculated difference.

The image sensor may perform a correlated double sampling on the detected $V_{rst\_color}$ (4) and $V_{sig\_color}$ (4) and may calculate a difference between the detected $V_{rst\_color}$ (4) and $V_{sig\_color}$ (4). The image sensor may obtain a blue color image based on the calculated difference.

The image sensor may perform the respective correlated double sampling, and thereby eliminate fixed pattern noise, 1/f noise, and the like caused by deterioration of a transistor of each pixel. The image sensor may maintain a voltage of an AN_BL node in an optimum voltage to help prevent the occurrence of the blooming phenomenon, e.g., based on a PINNING voltage of a PINNED photodiode during Tread-color.

After obtaining the color image, a depth image of an object can be obtained by detecting a reflected infrared light off that object, e.g., after the infrared light is radiated by a modulated pulse of infrared light at a certain frequency. Operations for obtaining a depth frame may include a first measurement and a second measurement, for example. The first measurement may be performed as follows. First, the image sensor may activate the TR signals TR1, TR2, TR3, and TR4 to have a same, for example, phase with an infrared light pulse modulated during the time period $T_{int\_depth}$ and store charges generated the reflected infrared light to the FD node. In this instance, the aforementioned four pixels 210, 220, 230, and 240 may operate as a single pixel. The time period corresponding to the first measurement is represented by a time period $T_{int\_depth1}$ and a time period $T_{read\_depth1}$ in FIG. 5. The image sensor may reset the FD node during the time period $T_{int\_depth1}$ and at the same time, process a depth value measured during th time period $T_{int\_depth1}$ to generate depth information corresponding to the first measurement. A conventional photodiode has significantly lower sensitivity with respect to infrared light compared to the conventional photodiode's sensitivity with respect to visible light. Again, in one or more embodiments, to solve this problem, the image sensor may collectively transfer the charges generated from the four photodiodes D1, D2, D3, and D4 to the single FD node, and thereby can embody four times the sensitivity for infrared light compared to a single photodiode.

The image sensor may deactivate the TR signals TR1, TR2, TR3, and TR4 and maintain the voltage of the AN_BL node relatively high during the time when the infrared light is not being radiated. The charges generated during the time when the infrared light is not being radiated may be discharged to the AN_BL node via second transfer transistors N12, N22, N32, and N42 so that the charges are not transferred to the FD node. The image sensor may maintain the voltage of the AN_BL node relatively low while the infrared light is radiated, and thereby can prevent discharging of the charges generated by the infrared light to the AN_BL node. Thus, in an embodiment, all the charges generated while the infrared light is radiated may be transferred to the FD node. Since a frequency of the infrared pulse is extremely fast, in a range of several MHz to several tens of MHz, radiation time is extremely short and a probability of blooming occurring during this period is very low, and thus the image sensor may set the voltage of the AN_BL node to be sufficiently low while the infrared light is being radiated. In addition, in such an infrared environment, since the amount of generated charges are potentially extremely small, the image sensor may perform the transferring of the charges to the FD node N times during the $T_{int\_depth1}$, for example. In this example, the image sensor may accumulate the charges in the FD node through the transferring operation performed N times. After the $T_{int\_depth1}$ the image sensor may detect the voltage of the FD node and reset the FD node and respective photodiodes D1, D2, D3, and D4.

The second measurement may be performed as follows. The image sensor may activate TR signals (TR1, TR2, TR3, and TR4) to have phase difference of 180 degrees with the modulated infrared light pulse during the time period $T_{int\_depth2}$, and thereby can store charges generated by reflected infrared light in the FD node. In an embodiment, the image sensor may perform the above mentioned operation N times during $T_{int\_depth2}$.

A time period corresponding to the second measurement may be represented by $T_{int\_depth2}$ and $T_{read\_depth2}$ in FIG. 5. For the time period $T_{read\_depth2}$, the image sensor may reset the FD node and at the same time, process a depth value measured during the time period $T_{int\_depth2}$ to generate depth information corresponding to the second measurement.

Thus, in such an embodiment, the image sensor may control the TR signals to have a phase difference of zero degrees from an infrared light pulse modulated during the first measurement to detect a voltage of the FD node and also control the TR signals to have a phase difference of 180 degrees from an infrared light pulse modulated during the second measurement to detect the voltage of the FD node. In this instance, the phase difference of 90 degrees may be possible depending upon exemplary embodiments. The image sensor may perform the first measurement and the second measurement, and thereby can detect the voltage of the FD node two times and can generate respective depth information corresponding to the first and second measurements. With such dual detection, the image sensor may eliminate an effect that the reflectivity of an object affects the measuring of a distance and generate a depth image based on the depth information corresponding to the first measurement and the depth information corresponding to the second measurement.

Figure 6:
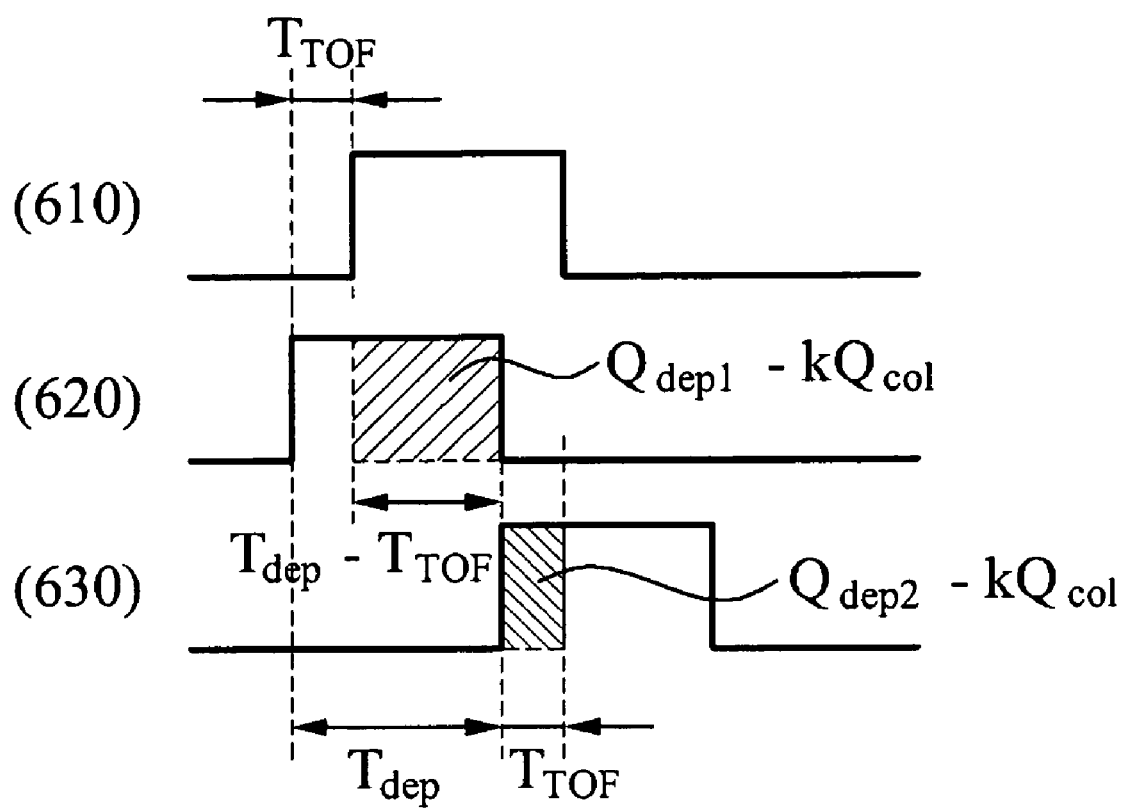
FIG. 6 illustrates a timing of the operation of FIG. 5, according to one or more embodiments.

FIG. 6 illustrates an example timing of the operation of FIG. 5, according to one or more embodiments.

Referring to FIG. 6, waveform 610 may represent reflected infrared light. The waveform 620 may represent a TR signal authorized during $T_{int\_depth1}$. The waveform 630 may represent a TR signal authorized during $T_{int\_depth2}$.

The illustrated $T_{dep}$ may represent a time period when the infrared light is radiated. Each of shaded regions of waveform 620 and 630 may further represent an amount of charge(s) that is transferred to a FD node from among charges generated by reflected infrared light.

The illustrated $T_{TOF}$ may represent a time since the radiated infrared light is reflected by the object until the reflected light is sensed by an image sensor.

An operation performed during $T_{int\_depth1}$ may be denoted as a first measurement and an operation performed during $T_{int\_depth2}$ may be denoted as a second measurement. Thus in such an embodiment, the image sensor transfers charges to the FD node during time ($T_{dep} \times T_{TOF}$) in the first measurement and transfers the charges to the FD node during time $T_{TOF}$ in the second measurement.

In the example arrangement, the photodiode D1 may sense red light as well as infrared light and the photodiodes D2 and D3 may sense green light as well as the infrared light, and the photodiode D4 may sense blue light as well as the infrared light. Accordingly, charges $Q_{dep1}$ that are stored in the FD node by each pulse of the first measurement may be expressed by the below Equation 1, for example.

$$Q_{dep1}=T_{dep}\times(i_r+i_{g1}+i_{g2}+i_b)+(T_{dep}-T_{TOF})\times i_{ir} \quad \text{Equation 1:}$$

Here, $i_r$ indicates a photocurrent generated by the photodiode D1, $i_{g1}$ indicates a photocurrent generated by the photodiode D2, $i_{g2}$ indicates a photocurrent generated by the photodiode D3, and $i_b$ indicates a photocurrent generated by the photodiode D4. Also, $i_{ir}$ indicates a photocurrent collectively generated by the photodiodes D1, D2, D3, and D4.

Charges $Q_{dep2}$, which are stored in the FD node by each pulse of the second measurement, may be expressed by the below Equation 2, for example.

$$Q_{dep2}=T_{dep}\times(i_r+i_{g1}+i_{g2}+i_b)+T_{TOF}\times i_{ir} \quad \text{Equation 2:}$$

The image sensor may further eliminate the effects from visible light using color image information obtained during the time period $T_{read\_color}$. When a color is obtained, the stored charges $Q_{col}$ may be expressed by the below Equation 3, for example.

$$Q_{col}=T_{col}\times(i_r+i_{g1}+i_{g2}+i_b) \quad \text{Equation 3:}$$

Here, the $T_{col}$ is color integration time and there is certain proportional relation between $T_{dep}$ and $T_{col}$. This relation may be expressed by the below Equation 4, for example.

$$T_{dep}=k\times T_{col} \quad \text{Equation 4:}$$

Here, k is a proportional constant. Thus, by combining Equations 1, 2, 3, and 4, the below example Equation 5 may be obtained.

$$\frac{Q_{dep1}-kQ_{col}}{Q_{dep2}-kQ_{col}}=\frac{T_{dep}-T_{TOF}}{T_{TOF}} \quad \text{Equation 5}$$

The below example Equation 6 may further be obtained by modulating the Equation 5.

$$T_{TOF}=\frac{T_{dep}(Q_{dep2}-kQ_{col})}{Q_{dep1}+Q_{dep2}-2kQ_{col}} \quad \text{Equation 6}$$

The image sensor may calculate TOF of the reflected infrared light using charge information obtained through the first measurement and the second measurement and calculate distance information between an object and the TOF and between the image sensor and the TOF.

Figure 7:
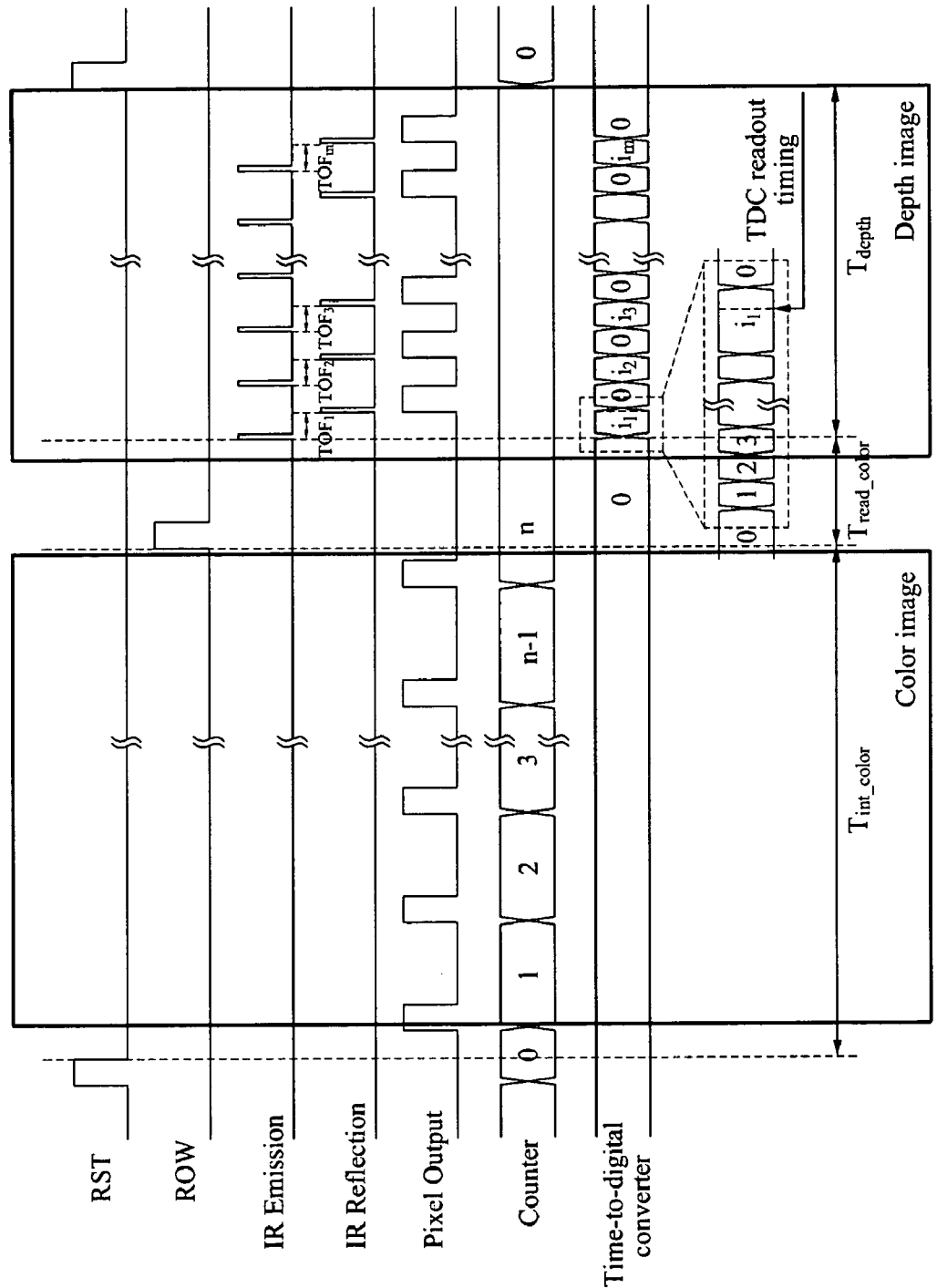
FIG. 7 is a timing diagram illustrating another example operation of an image sensor, such as that of FIG. 2, according to one or more embodiments.

FIG. 7 is a timing diagram illustrating another example of operations of an image sensor, such as the image sensor of FIG. 2, according to one or more embodiments.

In this embodiment, an example direct depth image generating method and a timing diagram for the method are provided.

Referring to FIG. 7, the image sensor may activate an RST signal to reset a voltage of a FD node before obtaining a color image.

This example direct method may calculate a distance by directly measuring time difference between radiated light and reflected light with a Time-to-digital converter (TDC), and the like. To perform the direct method, sensing of a signal as soon as the reflected light reaches an image sensor may be desired, and thus the image sensor may use an Avalanche photodiode (APD) with high sensitivity, for example. According to an embodiment, the image sensor may use an APD operated in a Geiger mode. Since gain may approach infinity in the Geiger mode, the sensitivity may significantly increase. The photodiode may be a Single Photon Avalanche Diode (SPAD), for example. In the SPAD, gain is extremely high, and thus a signal of a diode may be saturated even when one photon enters. The image sensor may thus require a specific readout circuit to read the saturated signal. The readout circuit may provide output of a pixel as a pulse.

The image sensor may count the number of pulses output from each pixels at the time when light of a specific frequency is not being radiated, and thus color information may be obtained. The image sensor may obtain the color information based on a number of pulse outputs counted during the $T_{int\_color}$. The pixel output signal indicates a pulse output from a pixel when the visible light or infrared light reacts with the SPAD. The number of pulses may be proportional to the strength of light, and thus the image sensor may calculate the color image based on the number of pulses.

The image sensor may obtain a TOF based on a time difference between radiated light of a specific frequency and reflected light of the specific frequency during $T_{depth}$.

The TDC may provide an output that increases by one over time, after light of the specific frequency is radiated. The TDC value may be fixed upon output of the pulse generated in response to the sensing of the reflected light. The image sensor may then read the fixed TDC value. The TDC may be reset after the image sensor reads the TDC value.

The image sensor may calculate $TOF_1$ based on a measured $i_1$ of the TDC. In the same manner, the image sensor may calculate $TOF_m$ based on a measured $i_m$ of the TDC.

Since the above mentioned operation may be performed within a very short period of time, after repeating the measuring of TOF m times, the image sensor may take an average value of $TOF_1$ to $TOF_m$ or select a value that is frequently measured from among the $TOF_1$ to $TOF_m$ as the TOF.

Figure 8:
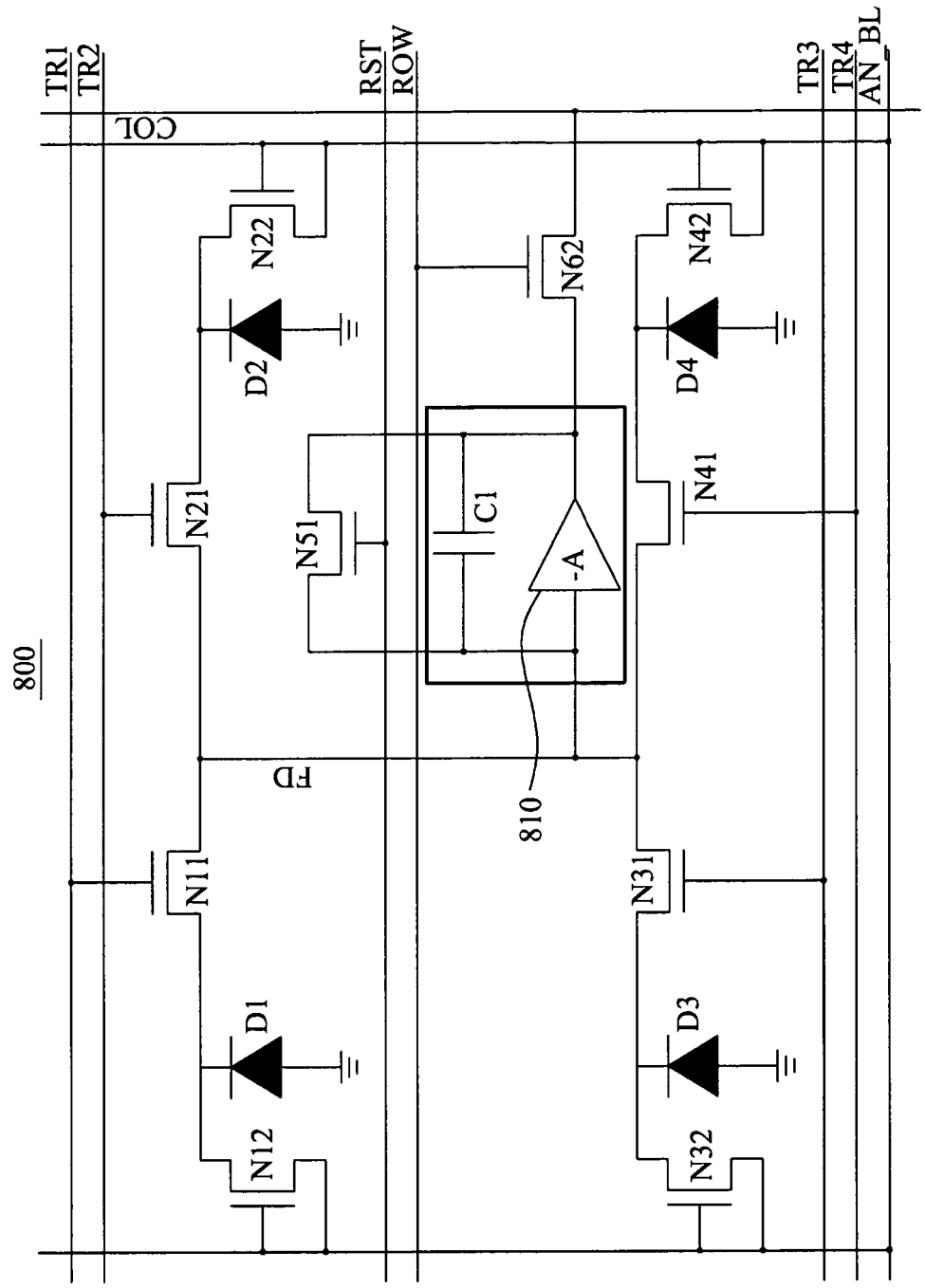
FIG. 8 illustrates a portion of an equivalent circuit of an image sensor, according to one or more embodiments.

FIG. 8 illustrates a portion of an equivalent circuit of an image sensor 800, according to one or more embodiments.

Referring to FIG. 8, a photodiode D1, transistor N11, and transistor N12 may be configured to generate a first pixel. The photodiode D2, transistor N21, and transistor N22 may be configured to generate a second pixel, the photodiode D3, transistor N31, and transistor N32 may be configured to generate a third pixel, and photodiode D4, transistor N41, and transistor N24 may be configured to generate a fourth pixel.

In this example, the four pixels may share a FD node and also share a reset transistor N51, operational amplifier 810, and feedback capacitor C1.

The reset transistor N51 may be configured so as to reset a voltage of the FD node based on a RST signal. The operational amplifier 810 and feedback capacitor C1 may further be configured so as to form a negative feedback loop. Here, the negative feedback loop may transfer all charges generated by the D1, D2, D3, and D4 to the feedback capacitor C1, for example.

Although the photodiodes D1, D2, D3, and D4 in this embodiment of FIG. 8 may not be PINNED photodiodes, for example, the deterioration of sensitivity may not occur with such a configuration. Accordingly, the image sensor may use the negative feedback loop, and thus an aforementioned example special process for forming the PINNED photodiode may not be required. Here, such an image sensor may not require such a PINNED special process, thereby reducing manufacturing costs. Also, the image sensor may enable a plurality pixels to share the operational amplifier 810 and feedback capacitor C1 that forms the negative feedback loop, thereby decreasing a size of the pixels.

Figure 9:
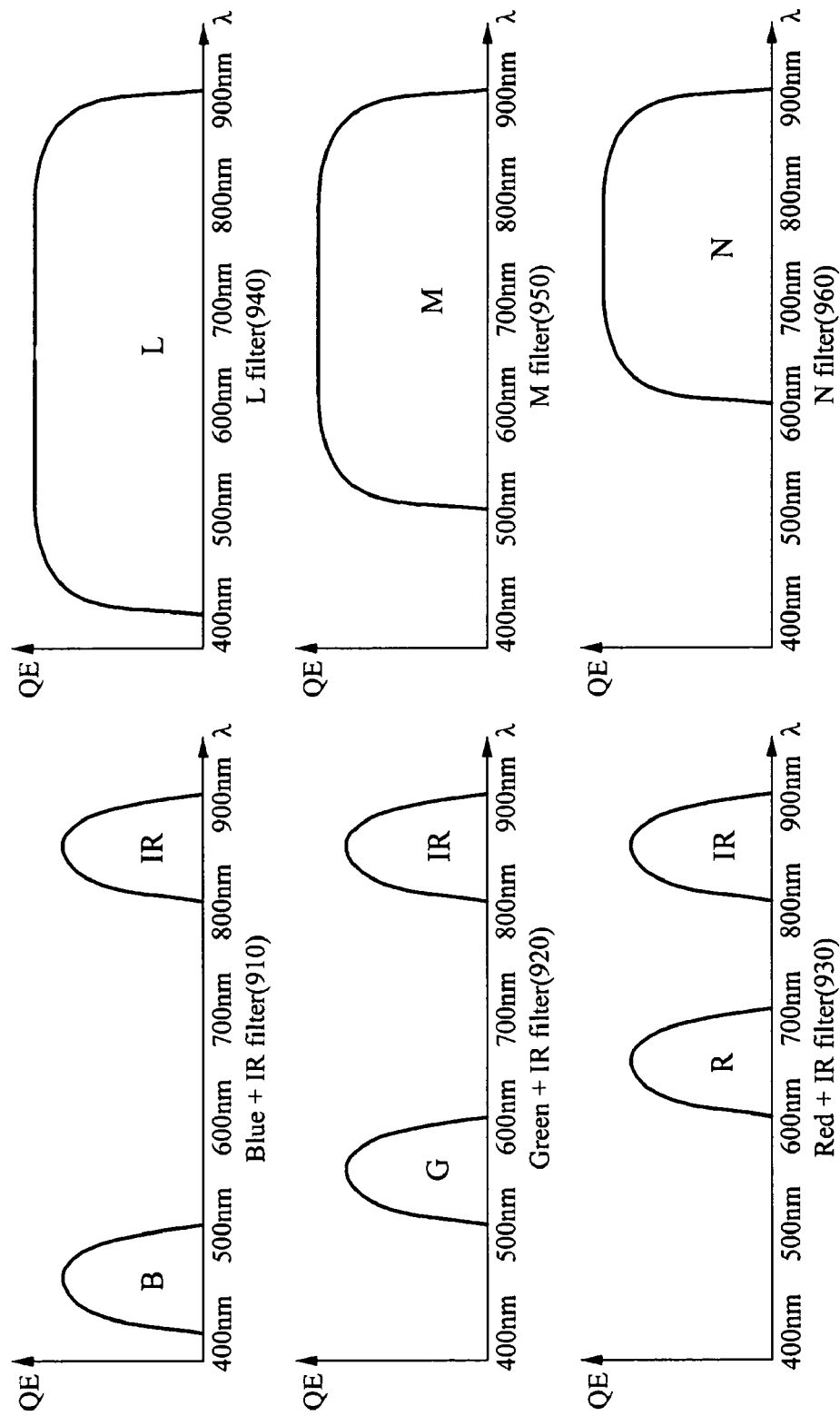
FIG. 9 illustrates examples of filters that may be used in an image sensor, according to one or more embodiments.

FIG. 9 illustrates examples of filters that may be used in an image sensor, according to one or more embodiments. Herein, illustrated filters could be considered band-pass filters as they selectively permit transmission of light, e.g., according to wavelength.

Referring to FIG. 9, the Blue+infrared (IR) Filter 910 is a filter that may pass blue light with a wavelength of 400 nm to 500 nm and infrared light with a wavelength of 800 nm to 900 nm, for example.

A Green+IR Filter 920 is a filter that may pass green light with a wavelength of 500 nm to 600 nm and infrared light with a wavelength of 800 nm to 900 nm, for example.

A Red+IR Filter 930 is a filter that may pass red light with a wavelength of 600 nm to 700 nm and infrared light with a wavelength of 800 nm to 900 nm, for example.

The image sensor may combine the Blue+IR Filter 910, a Green+IR Filter 920, and a Red+IR Filter 930 to generate a color image of R, G, and B and may generate a depth image using the infrared light.

An L Filter 940 is a filter that may pass light with a wavelength of 400 nm to 900 nm, for example. An M Filter 950 is a filter that may pass light with a wavelength of 500 nm to 900 nm, for example. An N Filter 960 is a filter that may pass light with a wavelength of 600 nm to 900 nm, for example. The feature of the L Filter 940, M Filter 950, and N Filter 960 is disclosed in "A 2.0-μm Pixel Pitch MOS Image Sensor With 1.5 Transistor/Pixel and an Amorphous Si Color Filter", M. Kasano, ISSCC 2005, pp. 348-349.

The image sensor may combine the L Filter 940, M Filter 950, and N Filter 960 to extract light and then perform a matrix operation to extract a value of R, G, and B and infrared light.

Figure 10:
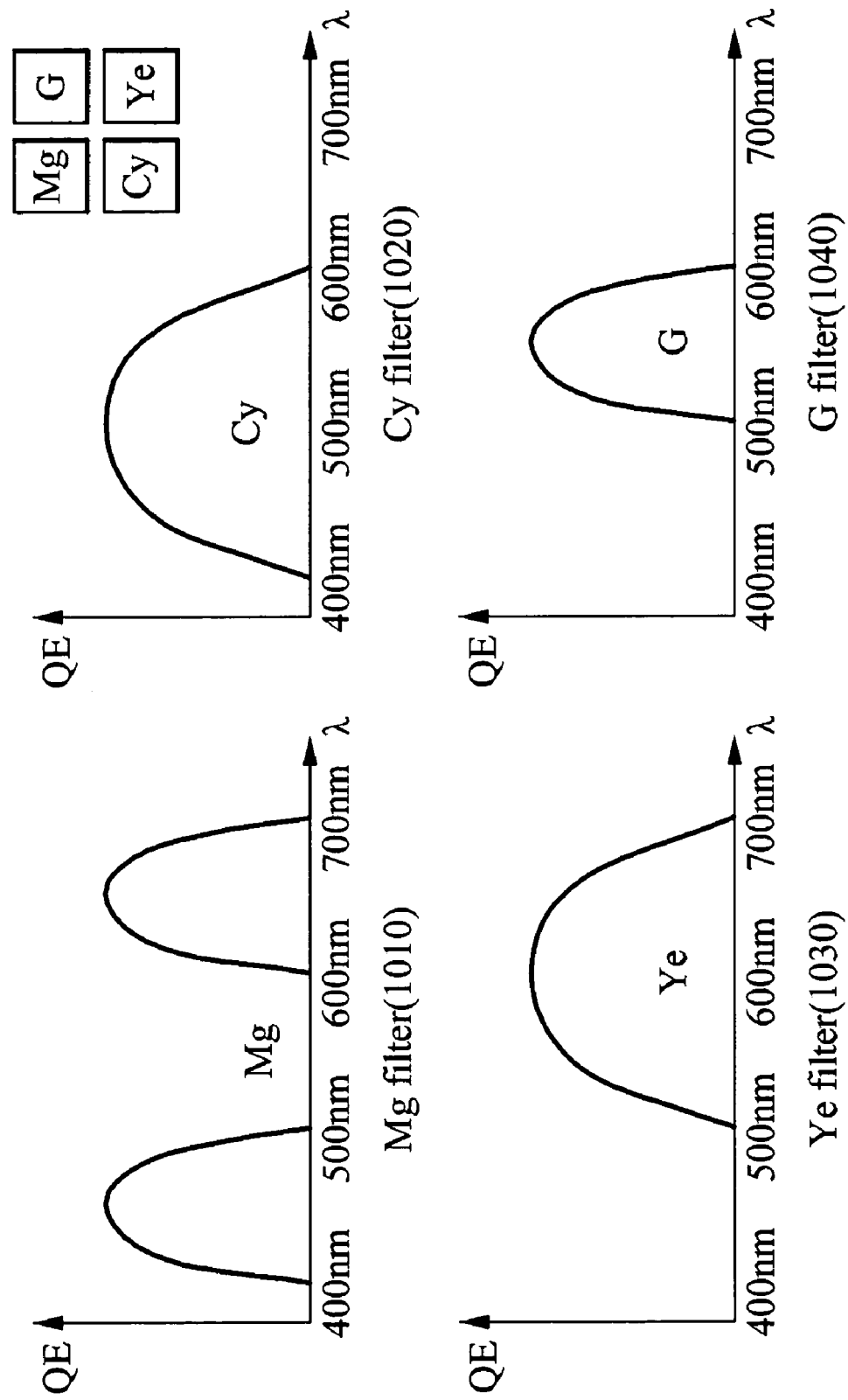
FIG. 10 illustrates other examples of filters that may be used in an image sensor, according to one or more embodiments.

FIG. 10 illustrates other examples of filters that can be used in an image sensor, according to one or more embodiments.

Referring to FIG. 10, a feature of filters of Magenta (Mg), Cyan (Cy), Yellow (Ye), and Green (G) is illustrated.

The Mg Filter 1010 is a filter that may pass blue light with a wavelength of 400 nm to 500 nm, for example, and red light with a wavelength of 600 nm to 700 nm, for example, namely a magenta color.

The Cy Filter 1020 is a filter that may pass blue light with a wavelength of 400 nm to 500 nm, for example, and green light with a wavelength of 500 nm to 600 nm, for example, namely a cyan color.

The Ye Filter 1030 is a filter that may pass green light with a wavelength of 500 nm to 600 nm, for example, and red light with a wavelength of 600 nm to 700 nm, for example, namely a yellow color.

The G Filter 1040 is a filter that may pass green light with a wavelength of 500 nm to 600 nm, for example.

The image sensor may combine information from the Mg Filter 1010, Cy Filter 1020, Ye Filter 1030, and G Filter 1040 for generation of a color image. The image sensor, or a image source combined with the image sensor such as in a camera system, may further radiate green light, for example, sense the reflected green light, and obtain distance information to generate a depth image. In this instance, the image sensor may further generate the depth image using the Cy Filter 1020, Ye Filter 1030, and G Filter 1040 excluding the Mg Filter 1010.

Figure 11:
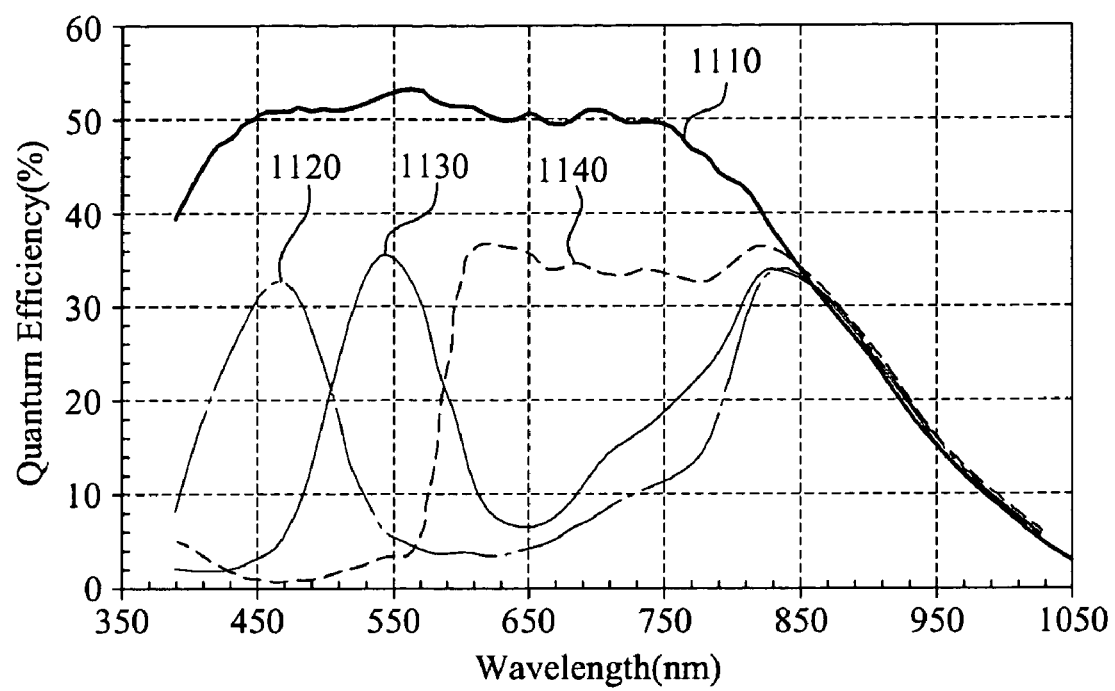
FIG. 11 collectively illustrates features of filters that may be used in an image sensor, according to one or more embodiments.

FIG. 11 collectively illustrates features for filters that may be used in an image sensor, according to one or more embodiments.

Referring to FIG. 11, a feature of filters of Mono 1110, Blue 1120, Green 1130 and Red 1140 is illustrated. FIG. 11 illustrates a feature used in a digital camera of a point Grey (Firefly MV).

The blue 1120 may pass a blue light band of visible light and infrared light band. The green 1130 may pass a green light band of the visible light and the infrared light band. The red 1140 may pass a red light band of the visible light and the infrared light band. The image sensor may obtain depth image using infrared light with a wavelength of 850 nm.

Figure 12:
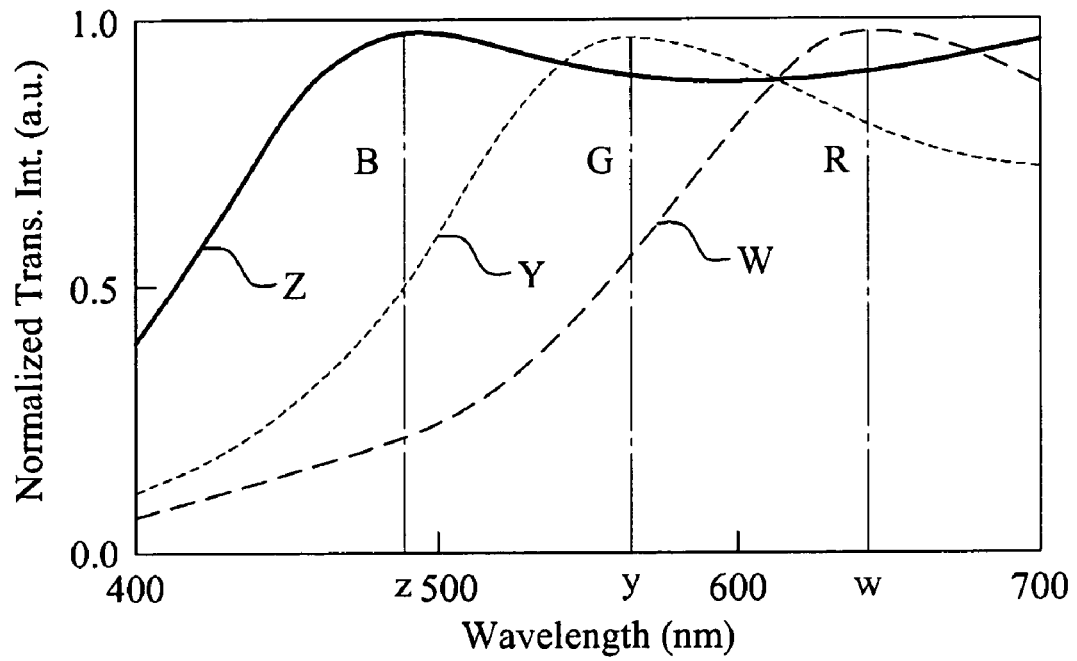
FIG. 12 collectively illustrates features of filters that may be used in an image sensor, according to one or more embodiments.
Figure 12:
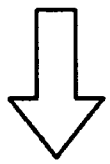
Figure 12:
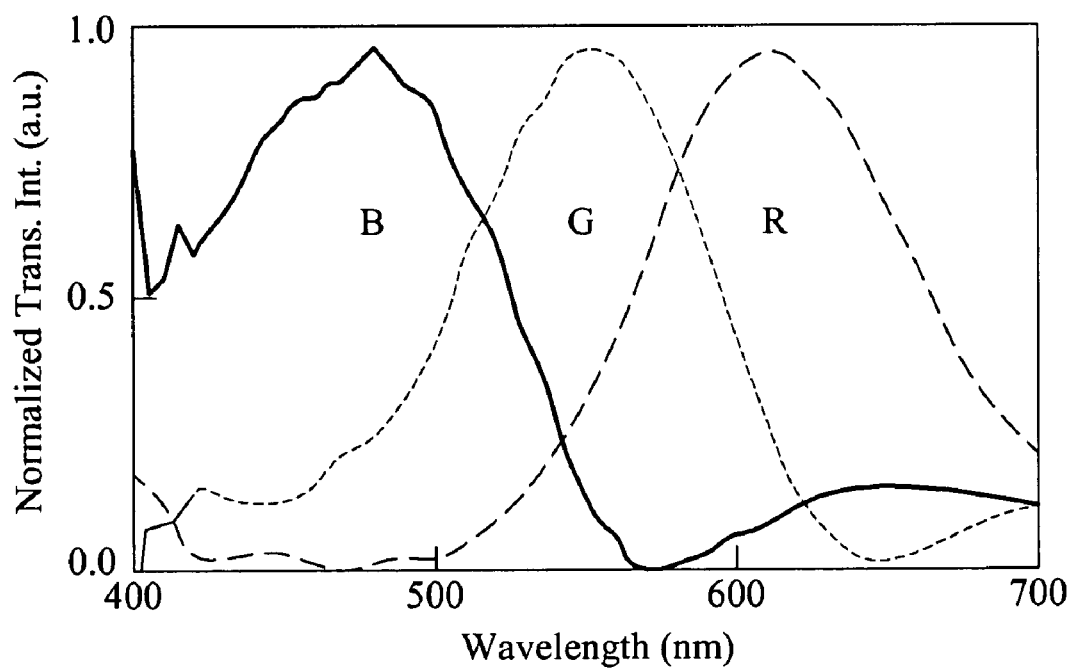

FIG. 12 collectively illustrates features for filters that may be used in an image sensor, according to one more embodiments.

The example filters of FIG. 12 are further discussed in "A 2.0-μm Pixel Pitch MOS Image Sensor With 1.5 Transistor/Pixel and an Amorphous Si Color Filter", M. Kasano, ISSCC 2005, pp. 348-349.

Here, as illustrated, the image sensor may calculate R, G, and B information based on an amount of charges generated by light passed through the Z, Y, and W filters. The calculation may be generalized to an operation of converting a normalized feature of a filter into an R, G, and B feature.

The image sensor according to an exemplary embodiment may provide a method and apparatus of obtaining a color image and depth image without needing to increase a number of pixels. Accordingly, depending on embodiment, the image sensor herein may increase pixel spatial resolution.

The image sensor may use infrared light or light with a specific frequency/wavelength, such as green light, and the like, to obtain the depth image, noting that alternative embodiments are equally available.

The image sensor may obtain the depth image using an indirect method or obtain the depth image using a direct method. The image sensor may be embodied using a PINNED photodiode or using a general photodiode.

The image sensor may take a structure that a plurality of pixels sharing a FD node and detecting circuit to reduce a fill factor. The number of the pixels that share the FD node and a corresponding detecting circuit may also be determined based on the space resolution.

A method of controlling an image sensor according to exemplary embodiments of the present invention may be implemented through computer readable code recorded in computer-readable media. The computer readable code may include program instructions, for example, and may control at least one processing device to implement various operations. The media may further include, data files, data structures, and the like. Examples of such computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of computer readable code include program instructions, such as both machine code, such as produced by a compiler, and files containing higher level code that may be executed by the processing device using an interpreter. The processing device may be embodied in a computer, as only an example.

One or more embodiments illustrate an image sensor that may be embodied using a Complementary Metal Oxide Semiconductor (CMOS) through a Charge Coupled Device (CCD), noting that alternatives are equally available.

One or more embodiments may be an imaging device, such as a digital camera, camcorder, a camera of a portable communication device, CCTV, and the like, including any application and corresponding device where depth measurement may be desired, such as medical imaging or remote operation of devices desiring accurate depth feedback. In addition, as noted above, such dual band-pass filtering image sensing systems may be open to alternative applications to the aforementioned color and depth imaging application, and thus embodiments should not be limited to the same.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image sensor, comprising:
   a plurality of pixels, with at least one of the plurality of pixels being configured to separately output an indication of a color value and an indication of a depth value.

2. The image sensor of claim 1, wherein the at least one pixel band-passes at least a first and second non-contiguous wavelength bands.

3. The image sensor of claim 1, wherein the at least one pixel includes a first and second pixel, with the first pixel band-passing at least a first and second wavelength bands, and the second pixel band-passing the second and a third wavelength band, such that the first and third wavelength bands are different.

4. The image sensor of claim 1, wherein the indication of the color value is generated by the at least one pixel during a first time period and the indication of the depth value is generated by the at least one pixel during a second time period.

5. The image sensor of claim 3, wherein the indication of the depth value is based on light reflected by light selectively radiated from a light source during the second time period.

6. The image sensor of claim 1, wherein each pixel of the plurality of pixels is used when obtaining respective pixel color values and depth values.

7. An imaging device, comprising:
   a light source; and
   an image sensor including a plurality of pixels, with at least one of the plurality of pixels being configured to separately output an indication of a color value and an indication of a depth value.

8. The imaging device of claim 7, wherein the at least one pixel band-passes at least a first and second non-contiguous light wavelength bands.

9. The imaging device of claim 7, wherein the at least one pixel includes a first and second pixel, with the first pixel band-passing at least a first and second light wavelength bands, and the second pixel band-passing the second and a third light wavelength band, such that the first and third light wavelength bands are different.

10. The imaging device of claim 7, wherein the indication of the color value is generated by the at least one pixel during a first time period and the indication of the depth value is generated by the at least one pixel during a second time period.

11. The imaging device of claim 10, wherein the light source selectively radiates light during the second time period.

12. The imaging device of claim 11, wherein the radiated light is non-visible light.

13. The imaging device of claim 12, wherein the radiated light is infrared light.

14. The imaging device of claim 10, wherein the at least one pixel senses a first light component during the first time period and senses a second light component during the second time period, with the first and second light components being different.

15. The imaging device of claim 14, wherein the indication of the color value is based on the first light component sensed during the first time period and the indication of the depth value is based on the second light component sensed during the second time period.

16. The imaging device of claim 7, wherein each pixel of the plurality of pixels is used when obtaining respective pixel color values and depth values.

17. An image sensor, comprising:
    a plurality of pixels,
    wherein each pixel of the plurality of pixels comprises a respective light-detector element and filter, with the respective filter being configured to band-pass a select incident visible light component to the respective light-detector element and band-pass a select incident non-visible light component to the respective light-detector element.

18. The image sensor of claim 17, wherein the respective light-detector element is a photodiode.

19. The image sensor of claim 17, wherein the non-visible light component is infrared light.

20. The image sensor of claim 17, wherein at least one pixel of the plurality of pixels includes a filter that band-passes a red light component and band-passes the select incident non-visible light component.

21. The image sensor of claim 17, wherein at least one pixel of the plurality of pixels includes a filter that band-passes a green light component and band-passes the select incident non-visible light component.

22. The image sensor of claim 17, wherein at least one pixel of the plurality of pixels includes a filter that band-passes a blue light component and band-passes the select incident non-visible light component.

23. The image sensor of claim 17, wherein at least one pixel of the plurality of pixels includes a filter that band-passes a cyan light component and band-passes the select incident non-visible light component.

24. The image sensor of claim 17, wherein at least one pixel of the plurality of pixels includes a filter that band-passes a magenta light component and band-passes the select incident non-visible light component.

25. The image sensor of claim 17, wherein at least one pixel of the plurality of pixels includes a filter that band-passes a yellow light component and band-passes the select incident non-visible light component.

26. The image sensor of claim 17, wherein areas of the respective filter included in each pixel of the plurality of pixels are identical.

27. The image sensor of claim 17, wherein the plurality of pixels are configured as an array of repeated 2×2 pixel groups.

28. The image sensor of claim 27, wherein a 2×2 pixel group, of the array of repeated 2×2 pixel groups, includes a red pixel, blue pixel, and two green pixels.

29. The image sensor of claim 27, wherein a 2×2 pixel group, of the array of repeated 2×2 pixel groups, includes a cyan pixel, magenta pixel, yellow pixel, and green pixel.

30. The image sensor of claim 17, wherein each of the plurality of pixels includes a first transferor that connects the respective light-detector element with a respective floating diffusion (FD) node, a driving unit to control a voltage of a bit-line based on a voltage of the FD node and a row control signal, and a second transferor that connects the respective light-detector element with a sink line.

31. The image sensor of claim 30, wherein at least two pixels of the plurality of pixels include respective first transferors and a same FD node, wherein the at least two pixels are configured to selectively separately connect corresponding respective light-detector elements with the FD node and to collectively connect the corresponding respective light-detector elements with the FD node.

32. An imaging device, comprising:
a light source generating a non-visible light component; and
a plurality of pixels,
wherein each pixel of the plurality of pixels comprises a respective light-detector element and filter, with the respective filter being configured to band-pass a select incident visible light component to the respective light-detector element and band-pass a select incident non-visible light component, having a defined relationship with the generated non-visible light component, to the respective light-detector element.

33. The imaging device of claim 32, wherein each pixel of the plurality of pixels respectively generates an indication of a color value based on respective select incident visible light components and respectively generates an indication of a depth value based on the select incident non-visible light component.

34. The imaging device of claim 33, wherein a color image is generated by correlating pixels of the color image to respective color values generated based on respective generated color value indications and a depth image is generated by correlating pixels of the depth image to respective depth values generated based on respective generated depth value indications.

35. The imaging device of claim 33, wherein each pixel of the plurality of pixels generates the indication of the color value during a first time period and generates the indication of the depth value during a second time period.

36. The imaging device of claim 35, wherein the light source selectively generates the non-visible light component during the second time period.

37. An image sensor, comprising:
at least one pixel,
wherein the at least one pixel comprises a first transferor that connects a light-detector element with a FD node, a driving unit that controls a voltage of a bit-line based on a voltage of the FD node and a row control signal, and a second transferor that connects the light-detector element with a sink line.

38. The image sensor of claim 37, wherein the FD node is configured to be selectively electrically connected to the first transferor of the at least one pixel and a second transferor of another pixel of the image sensor.

39. The image sensor of claim 38, wherein the at least one pixel and the other pixel are configured to selectively separately connect only one respective light-detector element with the FD node and to collectively connect respective light-detector elements, of the at least one pixel and the other pixel, with the FD node.

40. The image sensor of claim 37, wherein the first transferor transfers charges generated by the light-detector element to the FD node during a defined active time period and selectively generates an electrical disconnect between the light-detector element and the FD node during a defined inactive time period.

41. The image sensor of claim 40, wherein the second transferor selectively generates an electrical disconnect between the light-detector element and the sink line during the active time period and transfers charges generated by the light-detector element to the sink line during the inactive time period.

42. The image sensor of claim 40, wherein the second transferor is a transistor,
wherein a gate terminal and source terminal of the transistor are respectively connected with the sink line and a drain terminal of the transistor is connected with the light-detector element.

43. The image sensor of claim 40, wherein, during the active time period, the first transferor transfers, to the FD node, an amount of charge corresponding to a distance between an observed object and the at least one pixel.

44. The image sensor of claim 37, wherein the at least one pixel further comprises a reset transistor to reset the voltage of the FD node according to a reset control signal.

45. The image sensor of claim 37, wherein the driving unit comprises a driving transistor and selective transistor,
wherein a gate terminal of the driving transistor is connected with the FD node, a drain terminal of the driving transistor is connected with a power supply, and a source terminal of the driving transistor is connected with a drain terminal of the selective transistor, and
wherein a gate terminal of the selective transistor is connected with a row control signal, and a source terminal of the selective transistor is connected with the bit-line.

46. The image sensor of claim 37, wherein the driving unit comprises an amplifier that has a negative gain, an input terminal that is connected with the FD node, a capacitor that is connected with the input terminal and an output terminal of the amplifier, a reset transistor that resets a voltage difference between the input terminal and the output terminal of the amplifier according to a reset control signal, and a selective transistor,
wherein a gate terminal of the selective transistor is connected with the row control signal, a drain terminal of the selective transistor is connected with the output terminal of the amplifier, and a source terminal of the selective transistor is connected with the bit-line.

47. The image sensor of claim 37, wherein four pixels share a single FD node separate from any other pixels sharing any other FD nodes.

48. An imaging method, comprising:
sensing a first light component with a pixel during a first time period; and
sensing at least a second light component with the pixel during a second time period, with the first light component having a different light characteristic than the second light component.

49. The method of claim 48, wherein the sensing of the first light component includes measuring an intensity of the first light component and the sensing of the second light component includes measuring a time of flight (TOF) of the second light component.

50. The method of claim 48, wherein the first light component is a visible light component and the second light component is a non-visible light component.

51. The method of claim 50, wherein the second light component is infrared light.

52. The method of claim 48, further comprising:
generating a color value of the pixel based on the first light component sensed during the first time period; and
generating a depth value of the pixel based on the second light component sensed during the second time period.

53. An imaging method, comprising:
sensing a first light component with a plurality of co-located pixels during a first time period;
radiating a second light component based upon an ending of the sensing of the first light component, with the first light component having a different light characteristic than the second light component;
sensing at least a reflection of the radiated second light component off an object using the plurality of co-located pixels during a second time period; and
generating a depth image of the object from the sensed reflected light.

54. The method of claim 53, wherein the sensing of the first light component includes measuring an amplitude of the first light component and the sensing of the second light component includes measuring a time of flight (TOF) of the second light component.

55. The method of claim 53, wherein the first light component is a visible light component and the second light component is a non-visible light component.

56. The method of claim 55, wherein the second light component is infrared light.

57. The method of claim 53, further comprising:
generating a color image of the object based on the sensed first light component during the first time period.

58. The method of claim 57, wherein the generating of the color image comprises generating a color value for each pixel of the plurality of co-located pixels based on respective sensed first light components and obtaining the color image of the object by correlating the generated color values of each of the plurality of pixels to pixels of the color image.

59. The method of claim 57, wherein the generating of the color image comprises generating first sensed information based on the first light component sensed during the first time period and eliminating a noise generated by effects from another light component with respect to the first sensed information.

60. The method of claim 59, wherein the other light component is the second light component.

61. The method of claim 53, wherein the generating of the depth image of the object comprises obtaining a depth value of each pixel of the plurality of co-located pixels based on the reflected light being concurrently and collectively sensed by a defined group of plural pixels of the plurality of co-located pixels and generating the depth image of the object by correlating depth values of each defined group of the plural pixels to pixels of the depth image.

62. The method of claim 53, wherein the generating of the depth image of the object comprises generating second sensed information based on the second light component sensed during the second time period and eliminating a noise generated by effects from another light component with respect to the second sensed information.

63. The method of claim 62, wherein the other light component is the second light component.

64. The method of claim 53, wherein the generating of the depth image of the object is performed after operations of the radiating of the second light component, and sensing of the reflected light during the second time period is repeated a number of times equal to a threshold for the generating of the depth image.

65. The method of claim 53, wherein the sensing of the reflected light during the second time period comprises transferring information that is associated with charges generated by detection of the reflected light as sensed during an active time period of the second time period and discharging charges generated by the detection of the reflected light sensed during an inactive time period of the second time period.

66. An image sensor method, comprising:
configuring at least one pixel as an image sensor, including configuring the at least one pixel to have a light-detector element and a band-pass filter, configuring the at least one pixel to have a first transferor that connects the light-detector element with a FD node, configuring the at least one pixel to have a bit-line signal line, a row signal line, and a driving unit such that the driving unit is configured to control a voltage of a bit-line signal on the bit-line signal line based on a voltage of the FD node and a row control signal on the row signal line, and configuring the at least one pixel to have a second transferor and a sink line, with the light-detector element being configured to connect with the sink line.

67. The method of claim 66, further comprising configuring the FD node to be selectively electrically connected to the first transferor of the at least one pixel and a second transferor of another pixel of the image sensor.

68. The method of claim 67, further comprising configuring the at least one pixel and the other pixel to selectively separately connect only one respective light-detector element with the FD node and to collectively connect respective light-detector elements, of the at least one pixel and the other pixel, with the FD node.

69. The method of claim 66, further comprising configuring the first transferor so the first transferor transfers charges generated by the light-detector element to the FD node during a defined active time period and selectively generates an electrical disconnect between the light-detector element and the FD node during a defined inactive time period.

70. The method of claim 69, further comprising configuring the second transferor so the second transferor selectively generates an electrical disconnect between the light-detector element and the sink line during the active time period and transfers charges generated by the light-detector element to the sink line during the inactive time period.

71. The method of claim 69, further comprising configuring the second transferor to be a transistor so a gate terminal and source terminal of the transistor are respectively connected with the sink line and a drain terminal of the transistor is connected with the light-detector element.

72. The method of claim 69, further comprising configuring the first transferor so that during the active time period the first transferor transfers to the FD node an accumulated charge corresponding to light sensed by the at least one pixel.

73. The method of claim 66, further comprising configuring the at least one pixel to further comprises a reset transistor and a reset control line, the reset transistor being configured to reset the voltage of the FD node according to a reset control signal on the reset control line.

74. The method of claim 66, further comprising configuring the driving unit to have a driving transistor and selective transistor so that a gate terminal of the driving transistor is connected with the FD node, a drain terminal of the driving transistor is connected with a power supply, and a source terminal of the driving transistor is connected with a drain terminal of the selective transistor, and a gate terminal of the selective transistor is connected with a row signal line, and a source terminal of the selective transistor is connected with the bit-line signal line.

75. The method of claim 66, further comprising configuring the driving unit to have an amplifier that has a negative gain, an input terminal that is connected with the FD node, a capacitor that is connected with the input terminal and an output terminal of the amplifier, a reset transistor that resets a voltage difference between the input terminal and the output terminal of the amplifier according to a reset control signal, and configuring the driving unit to have a selective transistor so that a gate terminal of the selective transistor is connected with the row signal line, a drain terminal of the selective transistor is connected with the output terminal of the amplifier, and a source terminal of the selective transistor is connected with the bit-line signal line.

76. The method of claim 66, further comprising configuring the image sensor to have plural groups of pixels such that only one group of pixels, of the plural groups of pixels, share a single FD node and configuring the one group of pixels to selectively transfer an accumulated charge from respective pixels making up the one group of pixels to the single FD node collectively and separately.

77. A computer readable recording medium comprising computer readable code to control at least one processing device to implement the method of claim 48.

78. A computer readable recording medium comprising computer readable code to control at least one processing device to implement the method of claim 53.

79. A computer readable recording medium comprising computer readable code to control at least one processing device to implement the method of claim 66.

* * * * *